(12) United States Patent
Komma et al.

(10) Patent No.: US 8,456,978 B2
(45) Date of Patent: Jun. 4, 2013

(54) OBJECTIVE LENS, OPTICAL HEAD APPARATUS, OPTICAL INFORMATION APPARATUS AND INFORMATION PROCESSING APPARATUS

(75) Inventors: Yoshiaki Komma, Osaka (JP); Kazuhiro Minami, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/581,733

(22) PCT Filed: Jan. 30, 2012

(86) PCT No.: PCT/JP2012/000578
§ 371 (c)(1),
(2), (4) Date: Aug. 29, 2012

(87) PCT Pub. No.: WO2012/111263
PCT Pub. Date: Aug. 23, 2012

(65) Prior Publication Data
US 2013/0051204 A1 Feb. 28, 2013

(30) Foreign Application Priority Data
Feb. 14, 2011 (JP) .................................. 2011-028207

(51) Int. Cl.
*G11B 7/00* (2006.01)
(52) U.S. Cl.
USPC .................................................... 369/112.03
(58) Field of Classification Search
USPC .................. 369/112.1, 112.02, 112.03, 44.23, 369/44.24, 94, 112.04, 112.07, 112.22, 112.23
See application file for complete search history.

(56) References Cited

U.S. PATENT DOCUMENTS

| 5,446,565 | A | 8/1995 | Komma et al. |
|---|---|---|---|
| 8,098,562 | B2 | 1/2012 | Kimura |
| 8,223,612 | B2 * | 7/2012 | Kang ...................... 369/112.03 |
| 2005/0237898 | A1 | 10/2005 | Kimura |
| 2008/0192611 | A1 | 8/2008 | Yamasaki et al. |
| 2011/0235492 | A1 | 9/2011 | Yamasaki et al. |
| 2011/0242950 | A1 | 10/2011 | Komma et al. |
| 2012/0155240 | A1 | 6/2012 | Park et al. |

FOREIGN PATENT DOCUMENTS

| JP | 7-98431 | 4/1995 |
|---|---|---|
| JP | 3661680 | 6/2005 |
| JP | 2005-310315 | 11/2005 |
| JP | 2007-188558 | 7/2007 |

(Continued)

OTHER PUBLICATIONS

International Search Report issued Apr. 10, 2012 in International (PCT) Application No. PCT/JP2012/000578.

*Primary Examiner* — Nabil Hindi
(74) *Attorney, Agent, or Firm* — Wenderoth, Lind & Ponack, L.L.P.

(57) ABSTRACT

The present invention provides an objective lens, an optical head apparatus, an optical information apparatus, and an information processing apparatus that improve focal position detection accuracy. In order to reproduce information from an optical disk (28), an objective lens (25) collects a diffracted ray (15X) having a longer focal length, out of two diffracted rays (15X, 15Y), on an information recording surface (28L) via a base (28S) of the optical disk (28), and a distance (DF3) between the focal positions of the two diffracted rays (15X, 15Y) when the diffracted ray (15X) having a longer focal length is collected on the information recording surface (28S) is longer than double the distance (WD2) between the surface (25A) of the objective lens (25) and the surface (28A) of the base (28S) along the optical axis.

4 Claims, 18 Drawing Sheets

FOREIGN PATENT DOCUMENTS

| | | |
|---|---|---|
| JP | 3993870 | 10/2007 |
| JP | 2012-133867 | 7/2012 |
| WO | 2008/069302 | 6/2008 |
| WO | 2009/016847 | 2/2009 |

* cited by examiner

OBJECTIVE LENS, OPTICAL HEAD APPARATUS, OPTICAL INFORMATION APPARATUS AND INFORMATION PROCESSING APPARATUS

TECHNICAL FIELD

The present invention relates to an objective lens for converging light onto an optical information medium such as an optical disk; an optical head apparatus for reproducing, recording or erasing information on an optical information medium; an optical information apparatus having the optical head apparatus; and an information processing apparatus having the optical information apparatus.

BACKGROUND ART

An objective lens plays a role of converging light onto an information recording surface of an optical disk and forming a micro-spot. In order to implement a compatible lens, for allowing to converge light onto disks having different thicknesses of base material, including a compact disc (CD), a digital versatile disc (DVD) and a Blu-ray disc (BD), using a single objective lens, a combination of a diffraction structure and a dioptric lens is widely used (e.g. see Patent Literature 1).

Patent Literature 2 discloses an objective lens that has a diffraction structure which divides most of the light quantity of an incoming beam into two diffracted rays having mutually different orders of diffraction, and collects a diffracted ray having a longer focal length on the information recording surface via a protective layer of the optical disk.

An objective of Patent Literature 2 is to prevent a focus pull-in in error to a position closer than the original distance between the objective lens and the information recording surface, and this literature discloses that when the diffracted ray having a longer focal length is collected on the information recording surface of the optical disk, the distance between the focal positions of the two diffracted rays is longer than the distance between the objective lens and the surface of the protective layer.

Patent Literature 2 calls attention to a focus error signal that is generated when a target objective lens is applied to the optical head apparatus. In Patent Literature 2, a case of dividing the incident light quantity into a plus first order diffracted ray and a minus first order diffracted ray is described as an example. FIG. 16 is a diagram depicting light spots when an objective lens converges according to Patent Literature 2. The objective lens OBJ has an aberration correction element L1 and a condensing element L2. A diffraction structure is formed in the aberration correction element L1, for dividing most of the light quantity of the incoming beams into two diffracted rays, of which orders of diffraction are mutually different. Patent Literature 2 calls attention to a spot 31 where a plus first order diffracted ray generated from the diffraction structure is converged, and a spot 32 where a minus first order diffracted ray generated from the diffraction structure is converged, and it is assumed that one focus error signal change occurs respectively from these spot positions.

The focus error signal change is depicted in FIG. 17. FIG. 17 is a diagram for describing the focus error signal characteristic according to Patent Literature 2, and FIG. 18 is a diagram for describing the actual focus error signal characteristic according to Patent Literature 2.

In FIG. 17, the ordinate indicates a focus error signal intensity, and the abscissa indicates a distance between a position of the objective lens OBJ on the surface closest to the optical disk 28 on the optical axis and the surface of the optical disk 28, that is, the distance between the objective lens OBJ and the optical disk 28. The focus error signal 301, due to the spot 31 of the diffracted ray having a longer focal length, is generated in a place where the distance between the objective lens OBJ and the optical disk 28 is longer than that of the focus error signal 302, due to the spot 32 of the diffracted ray having a shorter focal length.

Referring back to FIG. 16, DF1 denotes a value of the distance between the spot 31 and the spot 32 expressed by an air converted length. Here the air converted length is a value generated by dividing the length on the optical disk by the refractive index of the optical disk 28. WD1 denotes a distance between the objective lens OBJ and the optical disk 28 in the optical axis direction when the spot 31 of the diffracted ray having the longer focal length is converged onto the information recording surface 28L of the optical disk 28. According to Patent Literature 2, the values of DF1 and WD1 establish the relationship shown in FIG. 17 respectively. DF1 is a distance between the focus error signal 301 and the focus error signal 302, and WD1 is a distance between the focus error signal 301 and the position where the distance between the objective lens OBJ and the optical disk 28 is zero, that is, the position where the objective lens OBJ and the optical disk 28 contact. Therefore if WD1<DF1, the focus error signal 302 does not appear until the objective lens OBJ collides with the optical disk 28, which means that focus control is not activated in error according to Patent Literature 2.

In reality, however, a focus error signal 303 is generated between the focus error signal 301 and the focus error signal 302, as shown in FIG. 18. Therefore the focus error signal 303 is detected before the focus error signal 301 is detected if the distance DF1, between the focal positions of the two diffracted rays, is merely set to be longer than the distance WD1 between the objective lens OBJ and the surface of the protective layer (WD1<DF1). As a result, focus control is activated in error, and the problem disclosed in Patent Literature 2 cannot be solved. Thus according to Patent Literature 2, the focus error signal 303, which appears between the focus error signal 301 and the focus error signal 302, is not considered, and focal position detection accuracy may not be improved.

CITATION LIST

Patent Literature

Patent Literature 1: Japanese Patent Application Laid-Open No. H7-98431
Patent Literature 2: Japanese Patent Application Laid-Open No. 2005-310315

SUMMARY OF INVENTION

To solve the above mentioned problem, it is an object of the present invention to provide an objective lens, an optical head apparatus, an optical information apparatus and an information processing apparatus that can improve the accuracy to detect focus position.

An objective lens according to an aspect of the present invention is an objective lens having a diffraction element for dividing light quantity of an incoming beam into two diffracted rays of which orders of diffraction are mutually different, wherein the objective lens collects a diffracted ray having a longer focal length, out of the two diffracted rays, on an information recording surface via a base of an optical disk, in order to record or reproduce information on/from the optical disk, and a distance between focal positions of the two diffracted rays when the diffracted ray having a longer focal length is collected on the information recording surface is longer than double the distance between the surface of the objective lens and the surface of the base along the optical axis.

According to this configuration, the objective lens collects a diffracted ray having a longer focal length, out of the two diffracted rays, on the information recording surface via the base material of an optical disk, in order to record or reproduce information on/from the optical disk. The distance between the focal positions of the two diffracted lays, when the diffracted ray having a longer focal length is collected on the information recording surface, is longer than double the distance between the surface of the objective lens and the surface of the base material along the optical axis.

According to the present invention, the distance between the focal positions of the two diffracted rays, when the diffracted ray having a longer focal length is collected on the information recording surface, is longer than double the distance between the surface of the objective lens and the surface of the base material along the optical axis, hence a focus pull-in in error to a position where the distance between the objective lens and the information recording surface of the optical disk is shorter than the original distance, can be prevented, and focal position detection accuracy can be improved.

The objects, features and advantages of the present invention will be more apparent from the detailed description and accompany drawings.

DESCRIPTION OF EMBODIMENTS

Embodiments of the present invention will now be described with reference to the accompanying drawings. The following embodiments are merely examples of carrying out the present invention, and are not intended to limit the technical scope of the present invention.

(Embodiment 1)

First it is described why the problem disclosed in Patent Literature 2 cannot be solved merely by setting WD1<DF1, as described in that document, when a focus error signal 303 is generated between a focus error signal 301 and a focus error signal 302.

Figure 1:
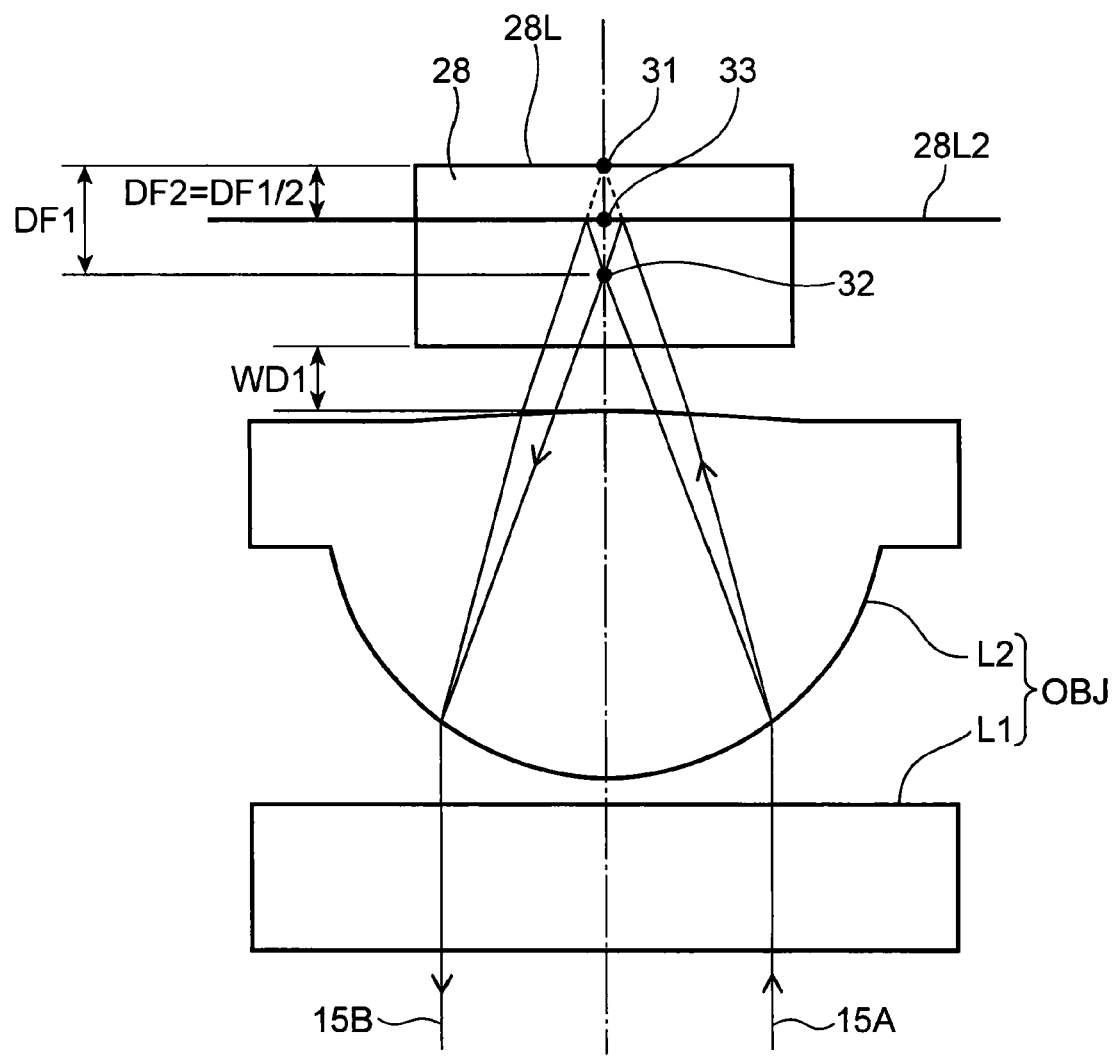
FIG. 1 is a schematic cross-sectional view of an objective lens for describing the problem to be solved by the present invention in detail.
Figure 2:
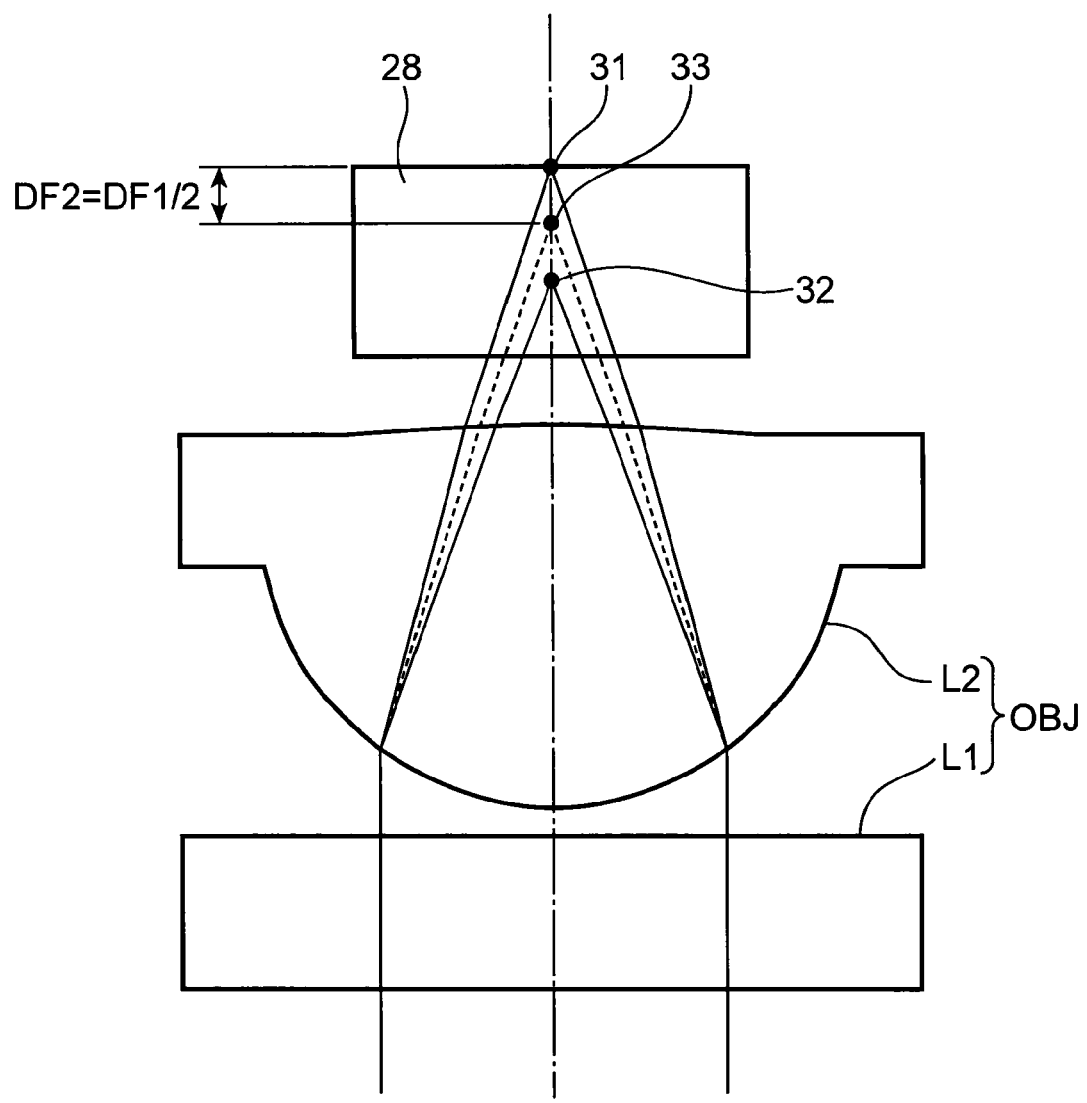
FIG. 2 is a schematic cross-sectional view depicting the focal position of the objective lens shown in FIG. 1.
Figure 3:
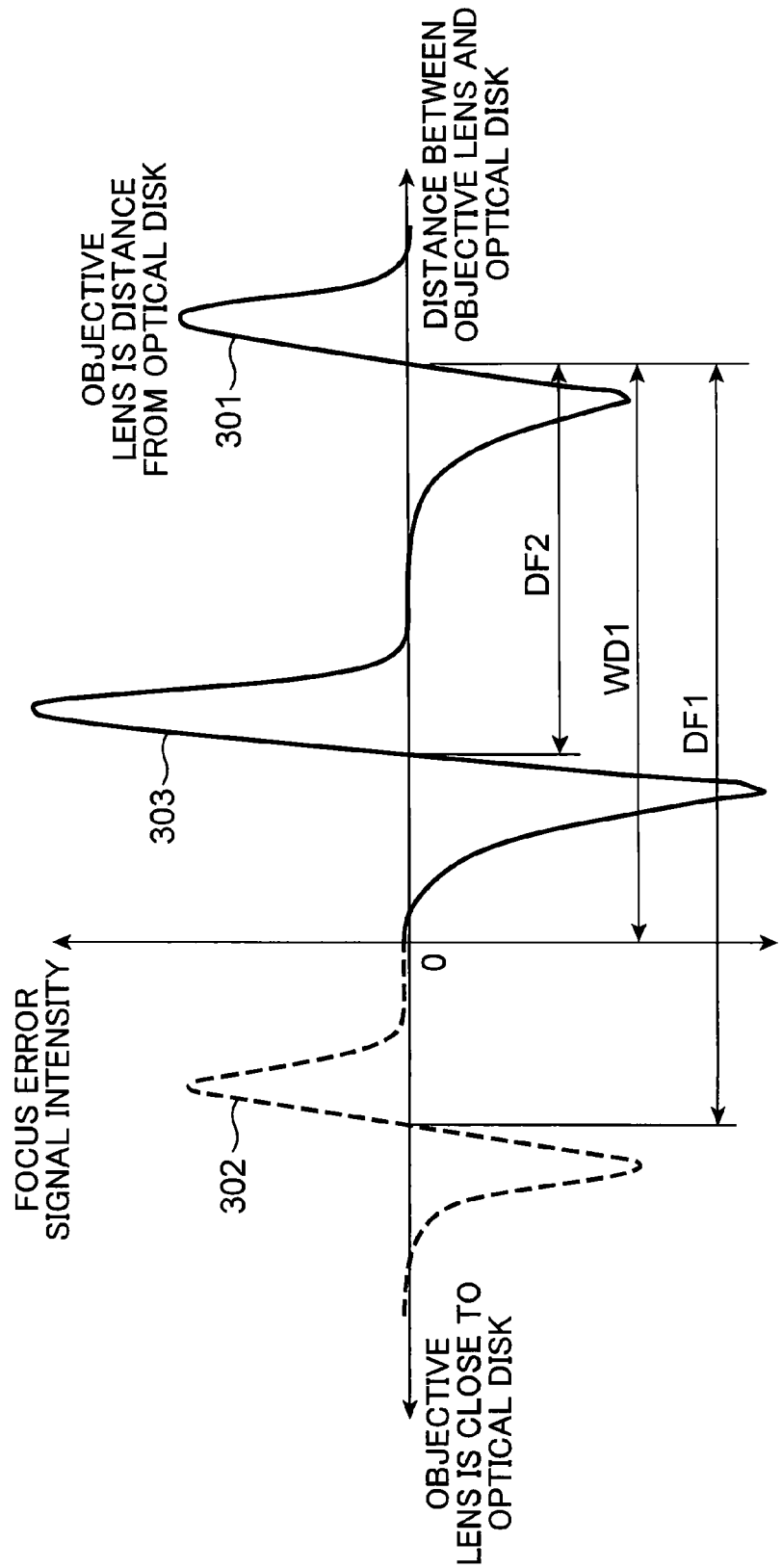
FIG. 3 is a diagram depicting a focus error signal characteristic in the objective lens shown in FIG. 1.

FIG. 1 is a schematic cross-sectional view of an objective lens for describing the problem to be solved by the present invention in detail, FIG. 2 is a schematic cross-sectional view depicting the focal position of the objective lens shown in FIG. 1, and FIG. 3 is a diagram depicting a focus error signal characteristic in the object lens shown in FIG. 1. The problem to be solved by the present invention will be described in detail with reference to FIG. 1 to FIG. 3. Just like the example in Patent Literature 2, a case when a plus first order diffractive light, out of the diffracted rays of incident light having wavelength $\lambda 1$ in FIG. 1, is converged onto a spot 31 on an information recording surface 28L of an optical disk 28 and a minus first order diffracted ray is converged onto a spot 32 thereon, is considered. Here it is assumed that the minus first order diffracted ray has a focal position closer to the objective lens OBJ than that of the plus first order diffracted ray, and that the focal position of the minus first order diffracted ray is in the position of the spot 32.

If a beam 15A having a wavelength $\lambda 1$ receives by a plus first order diffraction due to a diffraction structure of an aberration correction element L1, the beam 15A travels in the direction to the spot 31 as indicated by an arrow. This path of the beam 15A is called an "outward path". If the information recording surface 28L is at a focal position of the plus first order diffracted ray, the beam 15A travels the locus indicated by the dotted line, and reaches the spot 31. However if there is an information recording surface 28L2 at a position closer to the objective lens OBJ than the information recording surface 28L, the beam 15A is reflected by the information recording surface 28L2, and returns to the objective lens OBJ.

A beam 15B, which received the plus first order diffraction due to the diffraction structure of the aberration correction element L1, is reflected by the information recording surface 28L2, which is closer to the objective lens OBJ than the information recording surface 28L, therefore the beam 15B diverges downward in FIG. 1 wider than the incident light. The path of a beam that enters the diffraction structure again like this is called a "return path".

In the aberration correction element L1, light that receives the minus first order diffraction is also generated. In this example, the minus first order diffraction converts light to a position closer to the objective lens OBJ than the plus first order diffraction light, so the minus first order diffraction has a stronger function to converge light than the plus first order diffraction. Therefore if the plus first order diffracted ray, reflected by the information recording surface 28L2, receives the minus first order diffraction function in the return path, the divergence is suppressed. As a result, on the return path, the plus first order diffracted ray, reflected by the information recording surface 28L2, returns to light having a divergence angle similar to the light that entered the objective lens OBJ on the outward path.

In other words, a different order diffracted ray is converged onto a different position because the diffraction function has a lens function. The lens power of the lens function is approximately in proportion to the diffraction angle, and the diffraction angle is approximately in proportion to the order of diffraction. If the order of diffraction on the outward path and the order of diffraction on the return path are the M-th order and the N-th order respectively (M and N are integers), then light that passed through the outward path and the return path has received the (M+N)-th order diffraction function. Light that received only the lens function having a focal length up to the spot 31 on the outward path and the return path has received the second (=1+1) order diffraction power. Light that received only the lens function having a focal length up to the spot 32 on the outward path and return path has received the minus second (−1+−1) order diffraction power.

This means that a focal position is located in a diffraction spot position due to a diffraction of which order is half the total orders of the diffraction received on the outward path and return path. Therefore if a reflection surface is located in a position where the light is converged by the (M+N)/2-th order diffraction, the light that received the (M+N)-th order diffraction function appears to have a focal position on this reflection surface.

Light that received the plus first order diffraction on the outward path and received the minus first order diffraction on the return path appears to have a focal path in a spot position of the 0-th order diffracted ray, that is, an intermediate position between the spot 31 and the spot 32 due to these diffractions. Therefore if the information recording surface 28L2 is located in the intermediate position between the spot 31 and spot 32, the beam 15B returns with the same divergence angle as the beam 15A. Hence if this objective lens OBJ is installed in the optical head apparatus and a focus error signal is measured, a signal to indicate a focal position appears in the intermediate position between the spot 31 and spot 32. In other words, as FIG. 2 shows, the spot 33, due to the 0-th order diffracted ray, appears to exist even if the diffraction efficiency of the 0-th order diffraction is 0%. Because of this, a focus error signal 303 appears in the intermediate point between the focus error signal 301 and the focus error signal 302. Or as FIG. 3 shows, a focus error signal 303 appears in a position that is the distance DF2 (=DF1/2) away from the focus error signal 301.

Figure 16:
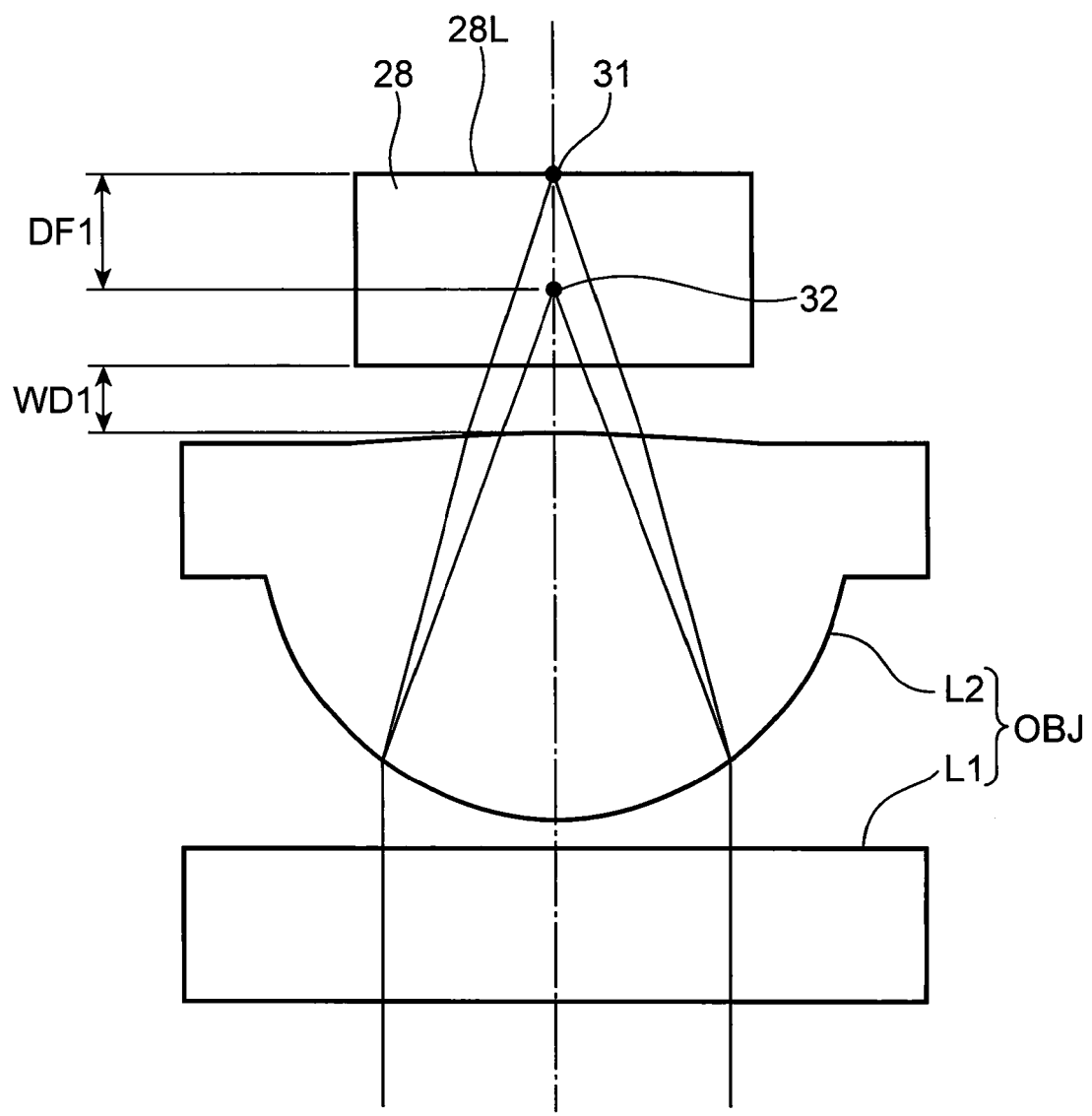
FIG. 16 is a diagram depicting a light spot converged by an objective lens according to Patent Literature 2.
Figure 17:
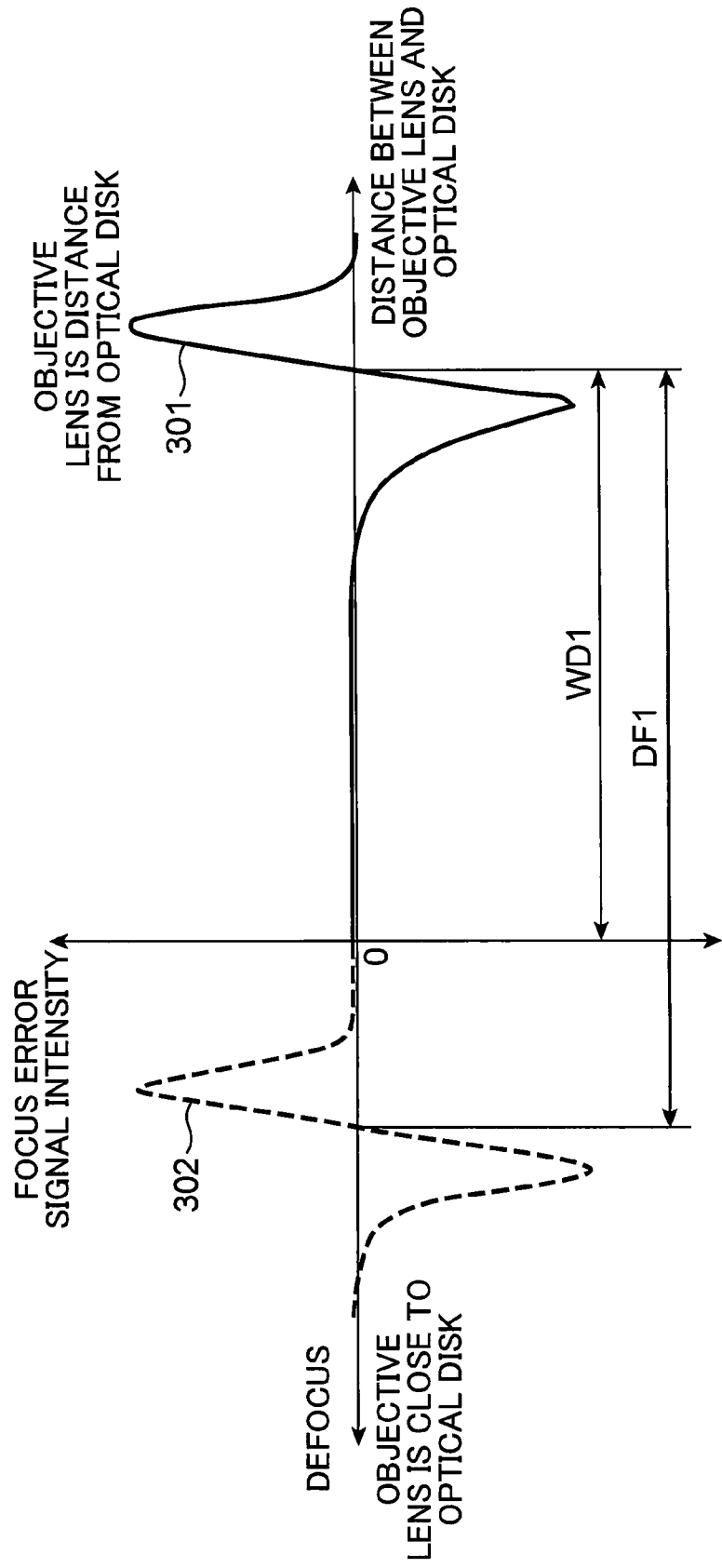
FIG. 17 is a diagram depicting a focus error signal characteristic according to Patent Literature 2.
Figure 18:
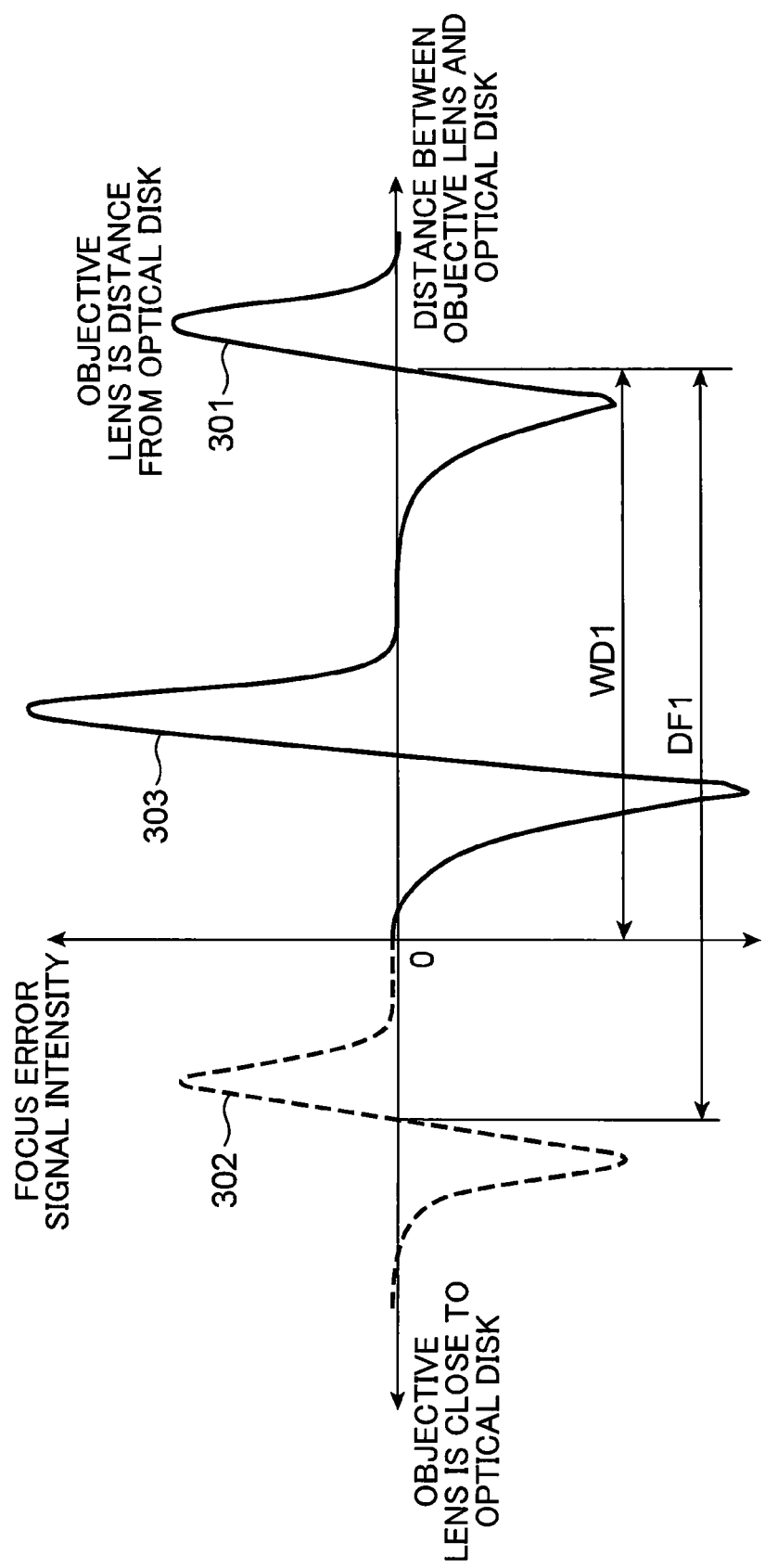
FIG. 18 is a diagram depicting an actual focus error signal characteristic according to Patent Literature 2.

A case of receiving the plus first order diffraction on the outward path and receiving the minus first order diffraction on the return path was described above, but the same function is exhibited if the minus first order diffraction is received on the outward path and the plus first order diffraction is received on the return path. Therefore in terms of the focus error signal, the focal positions appear to be in a same position in the case when the plus first order diffraction is received on the outward path and the minus first order diffraction is received on the return path, and in the case when the minus first order diffraction is received on the outward path and the plus first order diffraction is received on the return path. In the case of the diffraction efficiency of the plus first order diffraction and that of the minus first order diffraction being the same, if the light intensity of light, that receives the plus first order diffraction on the outward path and the return path respectively, is 1, the light intensity of the light that received the plus first order diffraction on the outward path and that received the minus first order diffraction on the return path is 1, and the light intensity of the light that received the minus first order diffraction on the outward path and that received the plus first order diffraction in the return path is also 1. Therefore the light intensity of the light in the outward path and return path totals 2. Therefore as FIG. 16 or FIG. 3 shows, the focal error signal 303, which is not considered in Patent Literature 2, could be a signal stronger than the focal error signal 301 or the focus error signal 302.

Generally the present inventors paid attention to phenomena where in an objective lens having a diffraction structure for dividing most of the light quantity of an incoming beam into two orders of diffracted rays, that is, an M-th order and an N-th order diffracted rays (M and N are mutually different integers) so that the M-th order diffracted ray having a longer focal length is collected on the information recording surface of an optical disk via the base material of the optical disk, a focus error signal, by which a converging point appears to be at an intermediate point between a converging point of the M-th order diffracted ray and a converging point of the N-th order diffracted ray, is generated.

According to the method of Patent Literature 2, a focus pull-in in error to a position where the distance between the objective lens and the information recording surface of the optical disk is shorter than the original distance cannot be prevented.

Therefore according to the objective lens of the present embodiment having a diffraction structure for dividing most of the light quantity of the incoming beam into two orders of diffracted rays, that is, the M-th order and N-th order diffracted rays (M and N are mutually different integers), so that the M-th order diffracted ray having a longer focal length is collected on the information recording surface of an optical disk via the base material of the optical disk, it is designed that the distance between the converging point of the M-th order diffracted ray and the intermediate point of the converging point of the M-th order diffracted ray and the N-th order diffracted ray is longer than the working distance, in order to prevent a focus pull-in in error.

Figure 4:
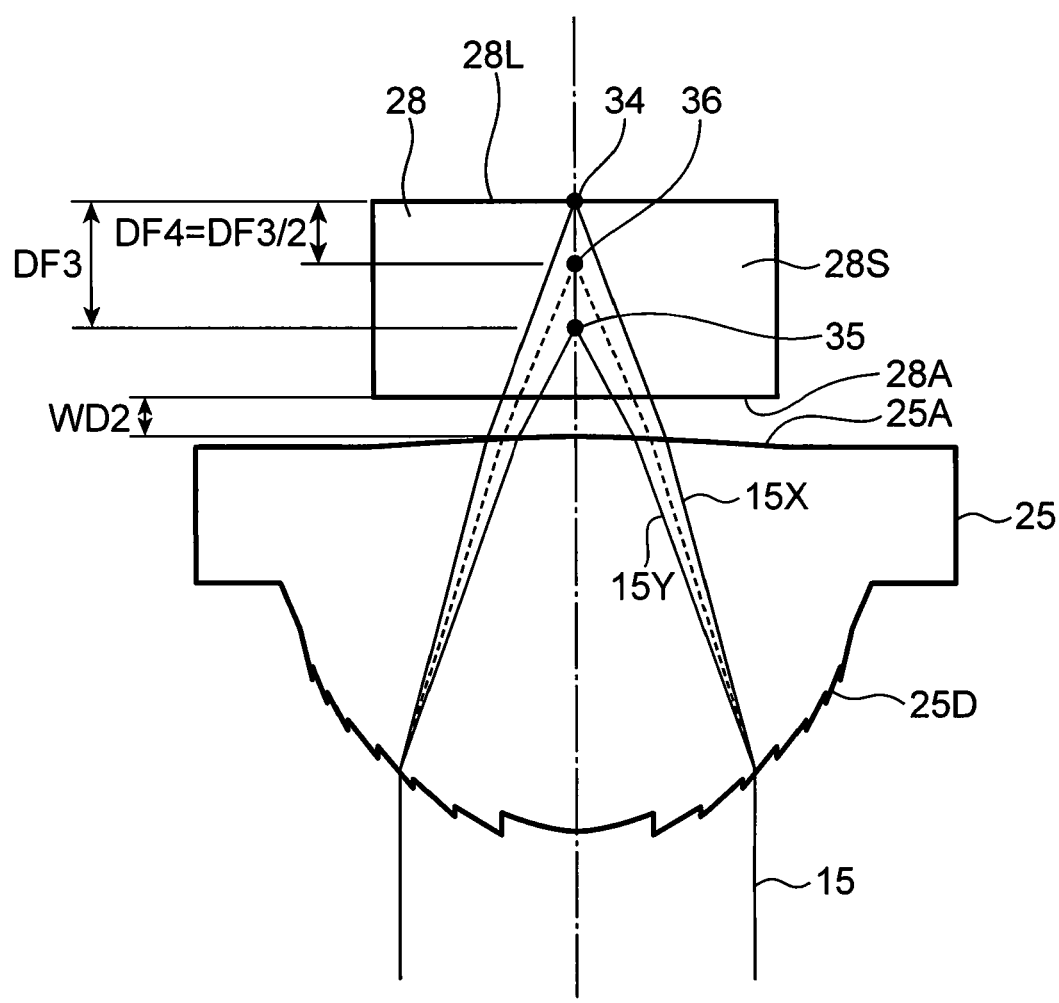
FIG. 4 is a schematic cross-sectional view depicting an objective lens according to Embodiment 1 of the present invention.
Figure 5:
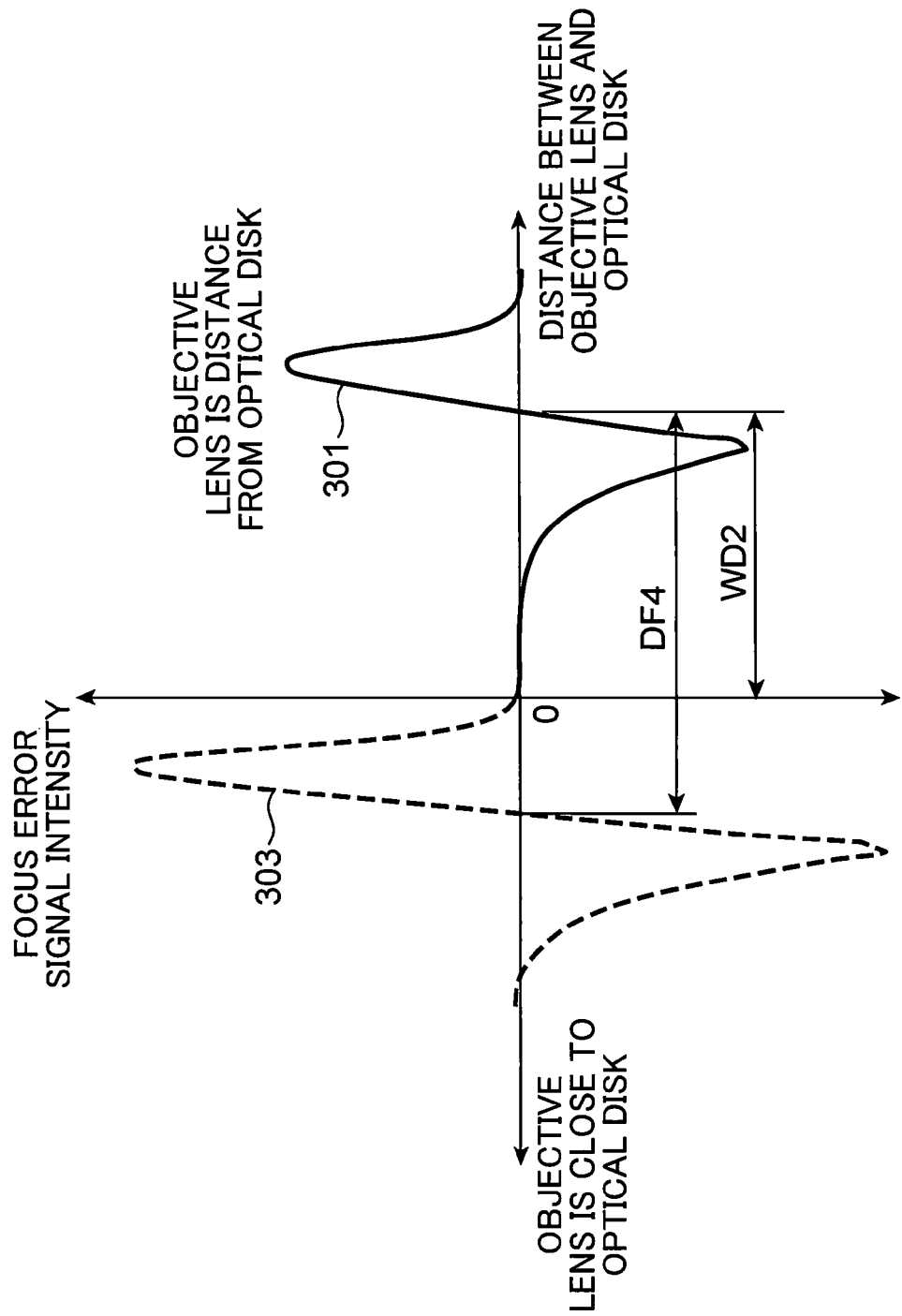
FIG. 5 is a diagram depicting a focus error signal characteristic of the objective lens according to Embodiment 1 of the present invention.

FIG. 4 is a schematic cross-sectional view depicting an objective lens according to Embodiment 1 of the present invention, and FIG. 5 is a diagram depicting a focus error signal characteristic of the objective lens according to Embodiment 1 of the present invention. As FIG. 4 shows, the distance DF4 between the converging point 34 of the M-th order diffracted ray and the intermediate point 36 of the converging point 34 of the M-th order diffracted ray and the converging point 35 of the N-th order diffracted ray is longer than the working distance WD2. The working distance WD2 refers to the distance between the surface of the objective lens and the surface of the base material of the optical disk along the optical axis when the diffracted ray, having a longer focal length, is collected on the information recording surface of the optical disk.

In other words, the distance DF3 between the converging point 34 of the M-th order diffracted ray and the converging point 35 of the N-th order diffracted ray is longer than double the working distance WD2 (DF3>2×WD2). In this case, the focus error signal 303 corresponding to the intermediate point 36 does not appear before the objective lens 25 and the optical disk 28 contact, as shown in FIG. 5, so focus control activating at a position closer to the objective lens than the converging point 34 of the M-th order diffracted ray can be prevented.

Here the distance DF3 and the distance DF4 are values converted into a distance in air, that is, air-converted lengths. The working distance WD2 is a closest distance between the surface of the object lens and the surface of the optical disk when the diffracted ray having a longer focal length is collected on the information recording surface via the base material of the optical disk.

Most of the light quantity of the incoming beam is divided into at least two orders of diffracted rays, that is, the M-th order and the N-th order diffracted rays (M and N are mutually different integers). This means that, as disclosed in Patent Literature 2, the M-th order diffracted ray and the N-th order diffracted ray are two diffracted rays of which diffraction efficiency is highest, and the total diffraction efficiency of the M-th order diffracted ray and the N-th order diffracted ray is 60% or more.

The objective lens 25 has the diffraction element 25D for dividing the light quantity of the incoming beam into at least two diffracted rays, 15X and 15Y, of which orders of diffraction are mutually different. In order to record or reproduce information on/from the optical disk 28, the objective lens 25 collects the diffracted ray 15X having a longer focal length, out of the two diffracted rays 15X and 15Y, on the information recording surface 28L via the base material 28S of the optical disk 28. The distance DF3 between the focal positions of the two diffracted rays 15X and 15Y, when the diffracted ray 15X having a longer focal length is collected on the information recording surface 28L, is longer than double the distance WD2 between the surface 25A of the objective lens 25 and the surface 28A of the base material 28S along the optical axis. Therefore a focus pull-in in error to a position where the distance between the objective lens 25 and the information recording surface of the optical disk 28 is shorter than the original distance can be prevented, and focal position detection accuracy can be improved.

Figure 6:
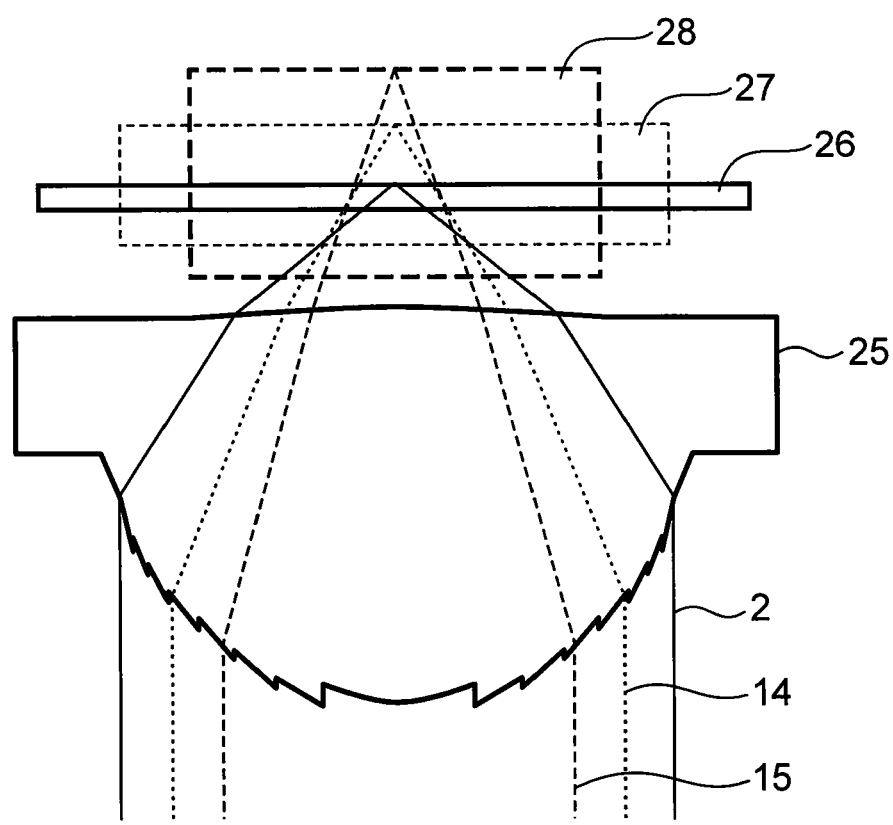
FIG. 6 is a schematic cross-sectional view depicting the objective lens of Embodiment 1 of the present invention, and a plurality of optical disks of which thicknesses of the base material are mutually different.

As mentioned above, the present embodiment is effective when using a compatible lens, which converges light using a single objective lens for disks having different base material thicknesses, such as a compact disc (CD), a digital versatile disc (DVD) and a Blu-ray disc (BD). FIG. 6 is a schematic cross-sectional view depicting the objective lens of Embodiment 1 of the present invention, and a plurality of optical disks of which thicknesses of the base material are mutually different. As FIG. 6 shows, a compatible lens (objective lens 25) converges a light beam (infrared light) 15 onto the innermost circumference portion near the optical axis via a transparent base material (approximately 1.2 mm thickness) of a low density optical disk 28, such as a CD. The objective lens 25 also converges a light beam (red light) 14 onto the intermediate circumference portion that is one size wider than the innermost circumference portion via a transparent base material (approximately 0.6 mm thickness) of such an optical disk 27 as a DVD. Furthermore the objective lens 25 converges a light beam (blue light) 2 onto a portion within the effective diameter via a transparent base material (approximately 0.1 mm thickness or less) of a high density optical disk 26, such as a BD.

In order to converge the respective lights via transparent base materials having different thicknesses, it is effective to use a diffraction element, as disclosed in Japanese Patent Publication No. 3661680, Japanese Patent Publication No. 3993870 or WO 2009/016847A1, for example. The diffraction element is designed in such a way that an innermost circumference portion, an intermediate circumference portion which is outside the innermost circumference portion, and an outermost circumference portion which is outside the intermediate circumference portion are discontinuous. Thereby the innermost circumference portion can converge light which passed through a base material having any thickness, and the outermost circumference portion can converge light which passed through a base material of which thickness is only 0.1 mm or less. The objective lens 25 shown in FIG. 4 has a diffraction element on the light entering surface facing the light source side. According to Embodiment 1, the diffraction element 25D is formed on the light entering surface of the objective lens 25 facing the light source, but the present invention is not limited to this, and the objective lens 25 may have a lens for collecting light and a diffraction element for diffracting light separately.

FIG. 6 shows three focal points, but these are converging spots generated from light beams having mutually different wavelengths respectively, and are completely different from the converging spots of different orders of diffracted rays which have a same wavelength, as shown in FIG. 4.

Figure 7:
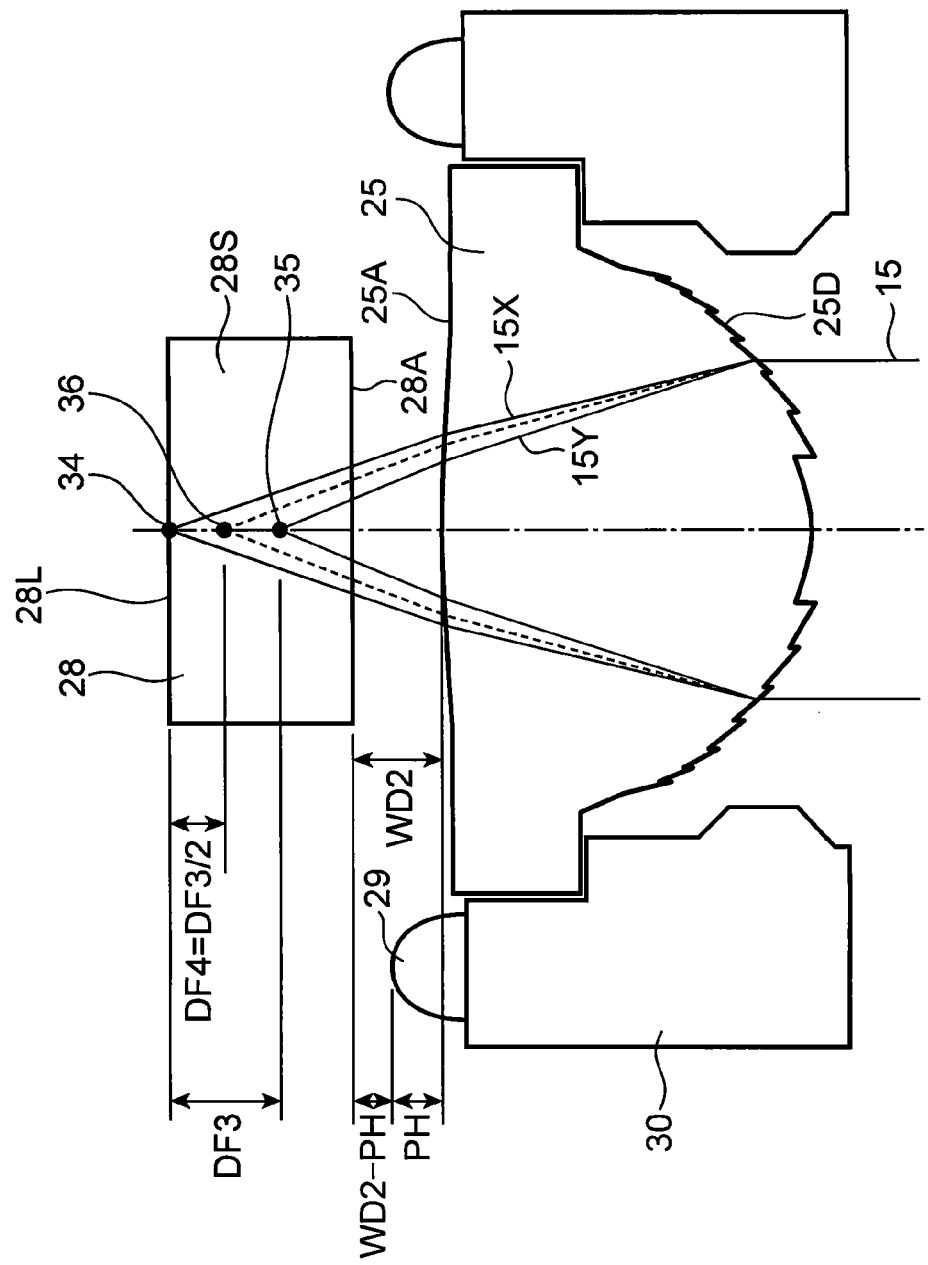
FIG. 7 is a schematic cross-sectional view depicting the objective lens of Embodiment 1 of the present invention and a lens holder.

FIG. 7 is a schematic cross-sectional view depicting the objective lens of Embodiment 1 of the present invention, and a lens holder. As FIG. 7 shows, the objective lens 25 is installed in the lens holder 30. It is preferable that the lens holder 30 has a protector 29 formed of a low-hardness material on the optical disk side. The protector 29 protrudes from the objective lens 25 toward the optical disk by a distance PH. The protector 29 can prevent the objective lens 25 from colliding with the optical disk 28, and scratching each other.

The distance WD2 between the optical disk 28 and the objective lens 25 does not become not more than the distance PH between the tip of the protruding portion of the protector 29 on the optical disk side and the portion of the objective lens 25 that is closest to the optical disk. Therefore if the lens holder 30 has the protector 29, the distance DF3 between the converging point 34 of the M-th order diffracted ray and the converging point 35 of the N-th order diffracted ray is set to be longer than double the distance obtained by subtracting the distance PH between the objective lens 25 and the edge of the protector 29 along the optical axis from the working distance WD2 between the objective lens 25 and the surface of the base material along the optical axis. This relationship is given by the inequality DF3>2×(WD2−PH).

In this way, the lens holder 30 has a protector 29 which protrudes from the surface 25A of the objective lens 25 toward the optical disk, and holds the objective lens 25. In order to record or reproduce information on/from the optical disk 28, the objective lens 25 collects the diffracted ray 15X having a longer focal length, out of the two diffracted rays 15X and 15Y, on the information recording surface 28L via the base material 28S. The distance DF3 between the focal positions of the two diffracted rays 15X and 15Y when the diffracted ray 15X, having a longer focal length collected on the information recording surface 28L, is longer than double the distance (WD2−PH) obtained by subtracting the distance PH of the protector 29, protruding from the surface 25A of the objective lens 25, from the distance between the surface 25A of the objective lens 25 and the surface 28A of the base material 28S along the optical axis.

(Embodiment 2)

Figure 8:
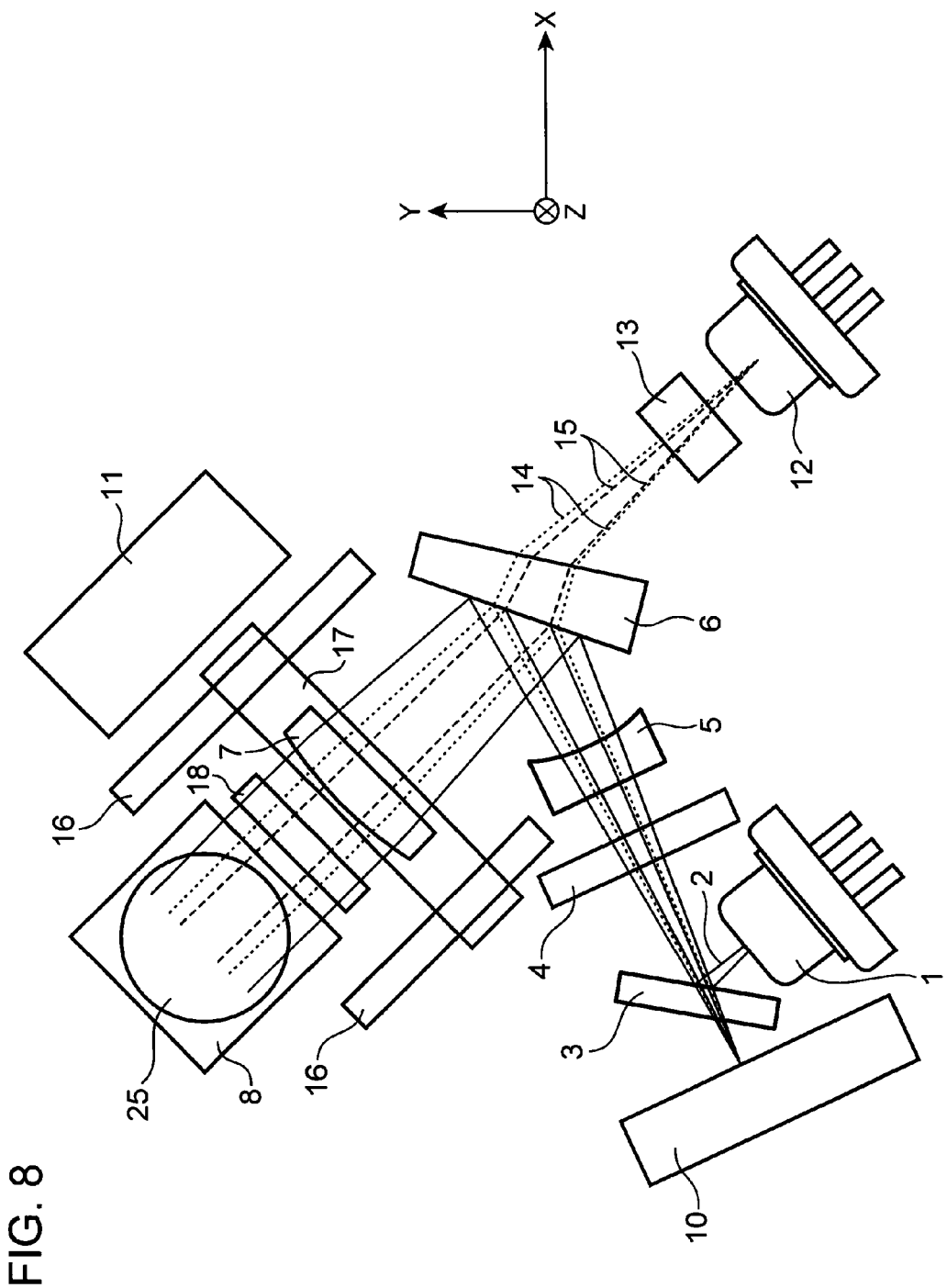
FIG. 8 is a diagram depicting a configuration of an optical head apparatus according to Embodiment 2 of the present invention.

FIG. 8 is a diagram depicting a configuration of an optical head apparatus according to Embodiment 2 of the present invention.

In FIG. 8, the Y axis direction is a direction vertical to the optical axis of the objective lens 25, and is a direction approximately vertical to a track extending direction on the optical disk (not illustrated). The Z axis direction is the optical axis direction, that is, the focusing direction of the objective lens 25 (vertical direction to the page face). The Y axis is a direction of moving the optical head apparatus when information is recorded on or reproduced from the inner circumference or outer circumference of the optical disk. The X axis is a direction vertical to the Z axis and the Y axis. The X axis is also a direction approximately parallel to the track extending direction on the optical disk in the position of the objective lens 25. The optical head apparatus may have a mirror-inverted configuration, where the X axis and the Y axis are switched, or may have a configuration where the X axis and the Y axis are rotated 90°, 180° or 270°.

The optical head apparatus shown in FIG. 8 has a first light source 1, a plane-parallel plate 3, a holographic optical element 4, a relay lens 5, a wedge 6, a collimator lens 7, a starting mirror 8, a photodetector 10, a second light source 12, a diffraction element 13, a quarter-wave plate 18 and the objective lens 25.

The first light source 1 emits a blue light beam. A linearly polarized light beam 2, emitted from the first light source (e.g. blue light source) 1, is reflected by a polarization separation film on a surface of the plane-parallel plate 3, and transmits through the holographic optical element 4. A reflection type holographic optical element (not illustrated) may be disposed in a position that is away from the optical axis of the holographic optical element 4, and where the incident light to the objective lens 25 is not interrupted, so that the diffracted ray, reflected by the reflection type holographic optical element, is received by the photodetector 10, and the light intensity of the light beam 2 is monitored. By this configuration, a monitor signal for stabilizing the light intensity can be obtained without increasing a number of components.

The light beam 2 transmitted through the holographic optical element 4 is converted into a beam which diverges widely by the relay lens 5. The relay lens 5 has a concave lens function. The relay lens 5 converts an angle from an aperture portion of the objective lens 25 into the first light source 1, that is, a numerical aperture (NA) on the light source side, is converted from a small NA near the light source to a large NA on the collimator lens 7 side. The light beam 2 transmitted through the relay lens 5 is reflected by the wedge 6 and enters the collimator lens 7. Then the parallelism of the light beam 2 is converted to be approximately parallel by the collimator lens 7.

The light beam 2 that passed through the collimator lens 7 passes through the quarter-wave plate 18 and enters the starting mirror 8. The quarter-wave plate 18 changes the linearly polarized light into a circularly polarized light. The optical axis of the light beam 2 is deflected in the Z direction, which is a direction vertical to the optical disk, by the starting mirror 8. The light beam 2 reflected by the starting mirror 8 enters the objective lens 25. The objective lens 25 converges the light beam 2 onto the information recording surface of the high density optical disk, such as a BD, via a transparent base material of which thickness is less than 0.6 mm, such as about 0.1 mm.

The objective lens 25 is the objective lens according to Embodiment 1. The objective lens 25 collects the light beam 2 emitted from the first light source 1 on the information recording surface of the optical disk via the base material of the optical disk.

Here the collimator lens 7 relaxes the parallelism of the light beam 2, that is, relaxes the divergence of the light beam 2. The collimator lens 7 may be constituted by a combination of two lenses. In the case of constituting the collimator lens 7 by two lenses, only one of the two lenses may be moved when the collimator lens 7 is moved in the optical axis direction to correct spherical aberration, as mentioned later.

The light beam 2 reflected by the information recording surface of the optical disk travels the original optical path in reverse, and becomes, by the quarter-wave plate 18, a linearly polarized light in a direction vertical to the emitting direction from the first light source 1. Then the light beam 2, along with a part of the light beam diffracted by the holographic optical element 4, transmits through the plane-parallel plate 3 on which surface the polarization separation film is formed, and is split into a direction different from the direction of the first light source 1. The photodetector 10 performs photoelectric conversion on the entered light beam 2, and obtains an electric signal for obtaining an information signal and a servo signal (a focus error signal for focal control, that is focus servo, and a tracking signal for tracking control). The photodetector 10 receives the light beam 2 reflected on the information recording surface, and outputs an electric signal according to the received light quantity.

The second light source 12 emits an infrared light. The light beam 15 emitted from the second light source (e.g. infrared light source) 12 forms a sub-spot on the optical disk. The light beam 15 transmits through the diffraction element 13 which diffracts a part of the light, and transmits through the wedge 6 of which cross-sectional form is a wedge. A part of the light beam 15 is diffracted by the diffraction element 13. Then the parallelism of the light beam 15 is converted to be approximately parallel by the collimator lens 7.

The light beam 15 that passed through the collimator lens 7 transmits through the quarter-wave plate 18, and enters the starting mirror 8. The optical axis of the light beam 15 is deflected in the Z direction, which is a direction vertical to the optical disk of which recording density is lower than a BD, such as a compact disc (CD), by the starting mirror 8. The light beam 15 reflected by the starting mirror 8 enters the objective lens 25. The objective lens 25 converges the light beam 15 onto the information recording surface of the optical disk, via a transparent base material of which thickness is approximately 1.2 mm.

The objective lens 25 collects the light beam 15 emitted from the second light source 12 on the information recording surface of the optical disk via the base material of the optical disk.

The light beam 15 reflected by the information recording surface of the optical disk travels the original optical path in reverse, and is split into a direction different from the direction of the second light source 12 by the polarization separation film formed on the surface of the wedge 6 facing the collimator lens 7. The light beam 15 that transmitted through the relay lens 5, the holographic optical element 4 and the plane-parallel plate 3 enters the photodetector 10. Just like the case of the light beam 2, the photodetector 10 performs photoelectric conversion on the entered light beam 15, and obtains an electric signal to obtain an information signal and a servo signal (a focus error signal for focal control, and a tracking signal for tracking control). The photodetector 10 receives the light beam 15 reflected on the information recording surface, and outputs an electric signal according to the received light quantity.

If an amplifier circuit is enclosed in the photodetector 10, a good information signal with high signal/noise (S/N) ratio can be obtained, the optical head apparatus can be downsized and slimmed, and stability can be implemented.

In order to record or reproduce information on/from an optical disk of which recording density is between the above mentioned two types of optical disk (e.g. DVD), a third light source that emits a red light may be disposed near the second light source 12, and a beam splitter for matching the optical path of the red light from the third light source and the optical path of the infrared light from the second light source may be included. However if a dual-wavelength light source, that emits light beams having two wavelengths (red light and infrared light), is used for the second light source 12, the beam splitter is unnecessary, and a number of components can be decreased. Hence according to the present embodiment, the second light source 12 is a dual-wavelength light source that emits a red light and an infrared light.

The red light beam 14 emitted from the second light source 12 reaches the objective lens 25, just like the infrared light (light beam 15). The objective lens 25 converges the light beam 14 onto the information recording surface of the optical disk, such as a DVD, via a transparent base material of which thickness is approximately 0.6 mm. The objective lens 25 collects the light beam 14 emitted from the second light source 12 on the information recording surface of the optical disk via the base material of the optical disk.

Just like the infrared light, the light beam 14 reflected by the information recording surface of the optical disk travels the original optical path in reverse, and the photodetector 10 performs photoelectric conversion the entered light beam 14. The photodetector 10 obtains an electric signal for obtaining an information signal and a servo signal (a focus error signal for focal control, and a tracking signal for tracking control). The photodetector 10 receives the light beam 14 reflected on the information recording surface, and outputs an electric signal according to the received light quantity.

A cube type beam splitter, in which two triangular transparent elements are glued together, can be used to split an optical path. However if a plane-parallel plate or a wedge is used as in this embodiment, a number of elements decreases, and manufacturing cost drops. In the case of disposing a single element beam splitter in nonparallel-optical paths from the light source to the objective lens and transmitting light through, it is preferable to use the wedge 6 as in this embodiment, and set the incident angle of the optical axis to less than 45°. This allows preventing the generation of astigmatism. However the generation of astigmatism is possible due to manufacturing error and other causes, even if these countermeasures are taken. Therefore according to the configuration of the embodiment shown in FIG. 8, the light beam 2, to be converged onto the optical disk having the highest density, is reflected without transmitting through the two beam splitters (plane-parallel plate 3 and wedge 6) in the nonparallel-optical paths from the first light source 1 to the collimator lens 7. Because of this configuration, good signal reproduction and good signal recording can be implemented, even for such a high density optical disk as a BD.

The objective lens 25 is secured in a lens holder (not illustrated), and is moved by an actuator (not illustrated) that finely-moves the objective lens 25.

The objective lens drive apparatus (objective lens actuator) can finely-move the objective lens 25 in both the focusing direction (Z axis direction), that is perpendicular to the information recording surface of the optical disk, and in the tracking direction of the optical disk (Y axis direction).

If an objective lens 25 of which numerical aperture is 0.85 or greater, for reproducing or recording information from/on such an optical disk as a BD, a spherical aberration clearly changes depending on the thickness of the transparent base material from the light incoming surface to the information recording surface of the optical disk. According to this embodiment, the divergence/convergence of the light traveling from the collimator lens 7 to the objective lens 25 is changed by moving the collimator lens 7 in the optical axis direction of the collimator lens 7. If the divergence/convergence of the light entering the objective lens changes, the spherical aberration changes. Therefore the spherical aberration caused by the thickness difference of the base material is corrected using the change of divergence/convergence.

A collimator lens drive unit 11 moves the collimator lens 7 in the optical axis direction of the collimator lens 7. In concrete terms, a stepping motor or a brushless motor can be used for the collimator lens drive unit 11. The optical head apparatus has a collimator lens drive unit 11, a holder 17 for holding the collimator lens 7, a guide shaft 16 for guiding the movement of the holder 17, and a gear (not illustrated) for transferring the drive force of the collimator lens drive unit 11 to the holder 17. If the holder 17 for holding the collimator lens 7 is integrated with the collimator lens 7, a number of components can be decreased.

If the optical axis of the collimator lens 7 is disposed not to be parallel with the Y axis in this embodiment, as in this embodiment, the collimator lens 7 moving unintentionally, by the inertial force generated due to acceleration/deceleration upon moving the entire optical head apparatus in the inner/outer circumferential direction of the optical disk, can be prevented.

An optical recording system that uses a blue light or a red light aims at recording or reproducing a large volume of information by increasing the information recording density using light having a short wavelength. In order to handle a large volume of information, the speed of recording or reproducing information must be increased as well. Particularly upon recording information, the information must be recorded at high-speed by changing the intensity of the emitting light at high-speed. In other words, the current supplied for emitting light from the blue light source must be modulated at high-speed in order to modulate the light intensity at high-speed. Furthermore, in order to modulate the current supplied to the light source at high-speed, circuits or a large scale integrated circuit (LSI) for controlling the emission current must be disposed near the light source. Many components of the circuit for controlling emission current are common for the blue light source and the red light source, so it is necessary to constitute these circuits as a single LSI to downsize the circuit size.

In summary, it is preferable that the circuits for controlling the emission current are configured as a single LSI (not illustrated in FIG. 8), and the blue light source and the red light source are disposed near this LSI. In order to record or reproduce information on/from a more inner circumferential side of an optical disk, it is preferable that the blue light source and the red light source are disposed on the outer circumferential side of the optical disk.

It is also preferable that the objective lens 25 is disposed so as to be aligned to the approximate center of the optical disk, and the optical head apparatus is moved to the inner or outer circumference by seek operation. By this configuration, a sub-beam is generated by the diffraction element 13, and the tracking signal detection can be detected based on the three-beam method using the sub-beam, therefore signals can be detected stably.

Since the optical head apparatus of this embodiment uses the above mentioned objective lens, focal position detection accuracy can be improved.

The configuration shown in FIG. 8 has been described as an example of the optical head apparatus of the present invention, but the present invention is not limited to the configuration of the optical head apparatus shown in FIG. 8. Needless to say, all that is required is that the optical head apparatus have an objective lens, and the objective lens is characterized in that the distance between the focal positions of the two diffracted rays is longer than double the working distance between the surface of the objective lens and the surface of the base material of the optical disk when the diffracted ray having a longer focal length is collected on the information recording surface of the optical disk.

The orders of diffraction of the diffracted rays having a strong diffraction intensity are not limited to a combination of one order (e.g. plus first order diffracted ray and minus first order diffracted ray), but may be changed appropriately according to conditions.

Figure 9:
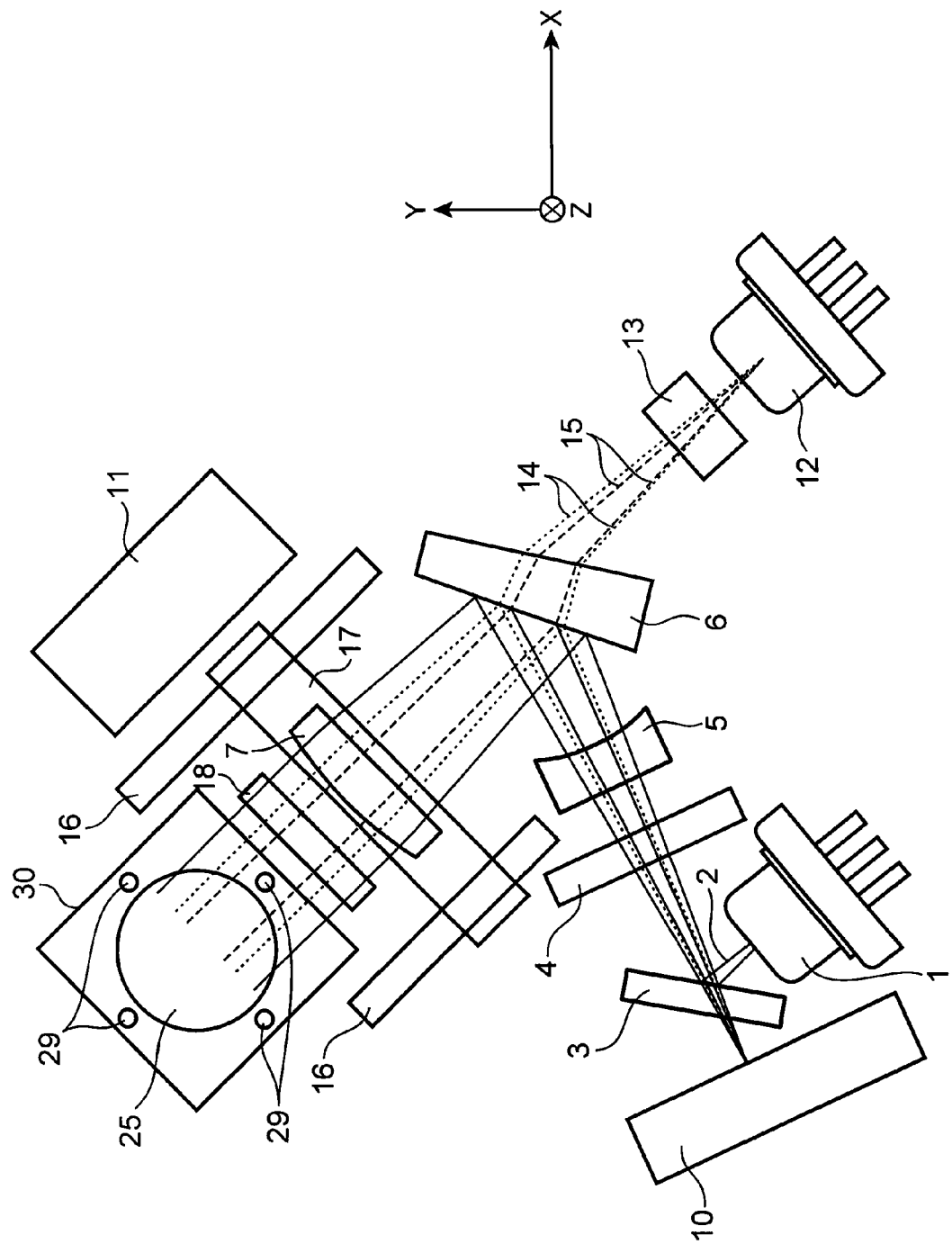
FIG. 9 is a diagram depicting a configuration of an optical head apparatus according to a modification of Embodiment 2 of the present invention.

FIG. 9 is a diagram depicting a configuration of an optical head apparatus according to a modification of Embodiment 2 of the present invention.

The optical head apparatus shown in FIG. 9 has a first light source 1, a plane-parallel plate 3, a holographic optical element 4, a relay lens 5, a wedge 6, a collimator lens 7, a starting motor 8, a photodetector 10, a second light source 12, a diffraction element 13, a quarter-wave plate 18, an objective lens 25 and a lens holder 30. In the optical head apparatus shown in FIG. 9, a composing element the same as that in the optical head apparatus shown in FIG. 8 is denoted with a same reference symbol, for which description is omitted. In FIG. 9, the starting mirror 8 is not illustrated, but is located under the objective lens 25 and the lens holder 30.

The lens holder 30 has a protector 29 which protrudes from the surface 25A of the objective lens 25 toward the optical disk, and holds the objective lens 25.

The configuration of the objective lens 25 and the lens holder 30 is the same as the configuration shown in FIG. 7. In other words, in order to record or reproduce information on/from the optical disk 28, the objective lens 25 collects the diffracted ray 15X having a longer focal length, out of the two diffracted rays 15X and 15Y, on the information recording surface 28L via the base material 28S. The distance DF3 between the focal positions of the two diffracted rays 15X and 15Y, when the diffracted ray 15X having a longer focal length is collected on the information recording surface 28L, is longer than double the distance (WD2−PH) obtained by subtracting the distance PH of the protector 29 protruding from the surface 25A of the objective lens 25 from the distance between the surface 25A of the objective lens 25 and the surface 28A of the base material 28S along the optical axis.

Therefore a focus pull-in in error, to a position where the distance between the objective lens 25 and the information recording surface of the optical disk is shorter than the original distance, can be prevented, even if the lens holder 30 has the protector 29, and focal position detection accuracy can be improved.

(Embodiment 3)

Figure 10:
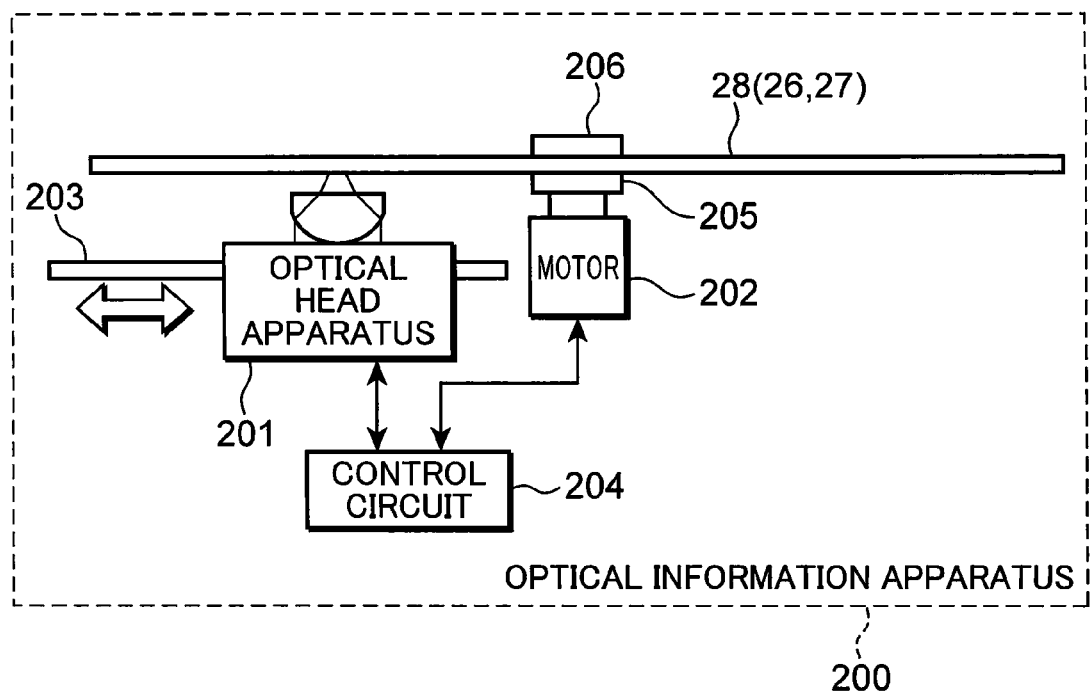
FIG. 10 is a diagram depicting a general configuration of an optical information apparatus according to Embodiment 3 of the present invention.

FIG. 10 shows an optical information apparatus using the optical head apparatus of the present invention. FIG. 10 is a diagram depicting a general configuration of the optical information apparatus according to Embodiment 3 of the present invention.

The optical information apparatus 200 has an optical head apparatus 201, a motor 202, a drive unit 203 and a control circuit (control unit) 204. The optical disk 28 (or 26 or 27 hereinafter) is secured between a turntable 205 and a damper 206, and is rotated by the motor 202.

The optical head apparatus 201 according to Embodiment 1 or 2 is mounted on the drive unit 203. The drive unit 203 moves the optical head apparatus 201 in the radius direction of the optical disk 28. Thereby the light irradiated by the optical head apparatus 201 can be moved from the inner circumference to the outer circumference of the optical disk 28.

The control circuit 204 performs focus control, tracking control, traverse control for transporting the optical head apparatus 201, and rotation control for the motor 202 based on a signal received from the optical head apparatus 201. The control circuit 204 also reproduces information based on a reproduction signal from the optical head apparatus 201, and transmits a record signal to the optical head apparatus 201.

In FIG. 10, the optical disk 28 is mounted on the turntable 205, and is rotated by the motor 202. The optical head apparatus 201 shown in Embodiment 1 or 2 is finely-moved toward the track position where desired information exists in the optical disk 28 by the drive unit 203 of the optical head apparatus 201.

The optical head apparatus 201 also transmits a focus error signal and a tracking error signal to the control circuit 204 corresponding to the positional relationship with the optical disk 28. Responding to the focus error signal and the tracking error signal, the control circuit 204 transmits a signal for finely-moving the objective lens to the optical head apparatus 201. By this signal, the optical head apparatus 201 performs focus servo (focus control) and tracking control for the optical disk 28, and reads (reproduces) information, writes (records) information or erases information.

Since the optical information apparatus of Embodiment 3 uses the optical head apparatus of Embodiment 1 or 2 as the optical head apparatus, focal position detection accuracy can be improved, and an optical disk can be recognized or sought more quickly.

(Embodiment 4)

Figure 11:
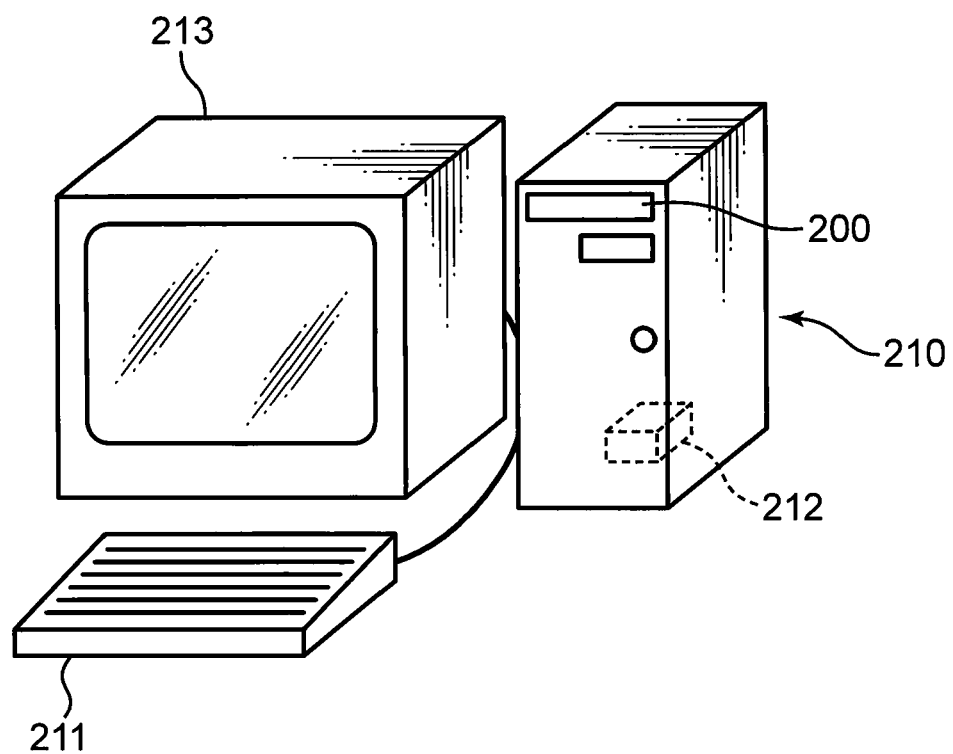
FIG. 11 is a schematic perspective view depicting a general configuration of a computer according to Embodiment 4 of the present invention.

FIG. 11 shows an embodiment of a computer having the optical information apparatus 200 of Embodiment 3. FIG. 11 is a schematic perspective view depicting a general configuration of the computer according to Embodiment 4 of the present invention.

In FIG. 11, the computer 210 has the optical information apparatus 200 of Embodiment 3, an input device 211, a processing unit 212 and an output device 213.

The input device 211 is constituted by a keyboard, a mouse or touch panel, for example, to input information. The processing unit 212 is constituted by a central processing unit (CPU), for example, and performs computing based on the information inputted from the input device 211 or information read from the optical information apparatus 200. The output device 213 is constituted by a display device (e.g. cathode ray tube, liquid crystal display device) or a printer, for example, and outputs information, such as a computed result by the processing unit 212. The display device displays information, such as a computed result by the processing unit 212, and the printer prints out information, such as a computed result by the processing unit 212.

In Embodiment 4, the computer 210 corresponds to an example of the information processing apparatus, and the processing unit 212 corresponds to an example of the information processing unit.

A computer that has the optical information apparatus 200 of Embodiment 3, or a computer that uses the above mentioned recording method or reproduction method can recognize an optical disk, or can seek an optical disk quickly.

(Embodiment 5)

Figure 12:
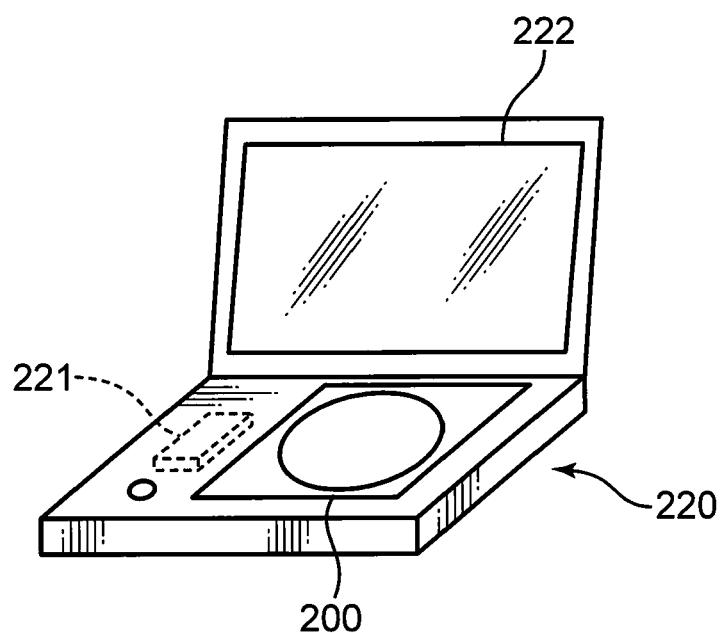
FIG. 12 is a schematic perspective view depicting a general configuration of an optical disk player according to Embodiment 5 of the present invention.

FIG. 12 shows an embodiment of an optical disk player having the optical information apparatus 200 of Embodiment 3. FIG. 12 is a schematic perspective view depicting a general configuration of the optical disk player according to Embodiment 5 of the present invention.

In FIG. 12, the optical disk player 220 has the optical information apparatus 200 of Embodiment 3, and a decoder 221 for converting an information signal obtained from the optical information apparatus 200 into an image signal. The optical disk player 220 can also be used as a car navigation system by adding a position sensor, such as GPS, and a central processing unit (CPU). The optical disk player 220 may have a display device 222. The display device 222 is constituted by a liquid crystal display device, for example, and displays an image signal converted by a decoder 221.

In Embodiment 5, the optical disk player 220 corresponds to an example of an information processing apparatus, and the decoder 221 corresponds to an example of an information processing unit.

The optical disk player that has the optical information apparatus 200 of Embodiment 3, or the optical disk player that uses the above mentioned recording method or the reproduction method can recognize an optical disk or can seek an optical disk quickly.

(Embodiment 6)

Figure 13:
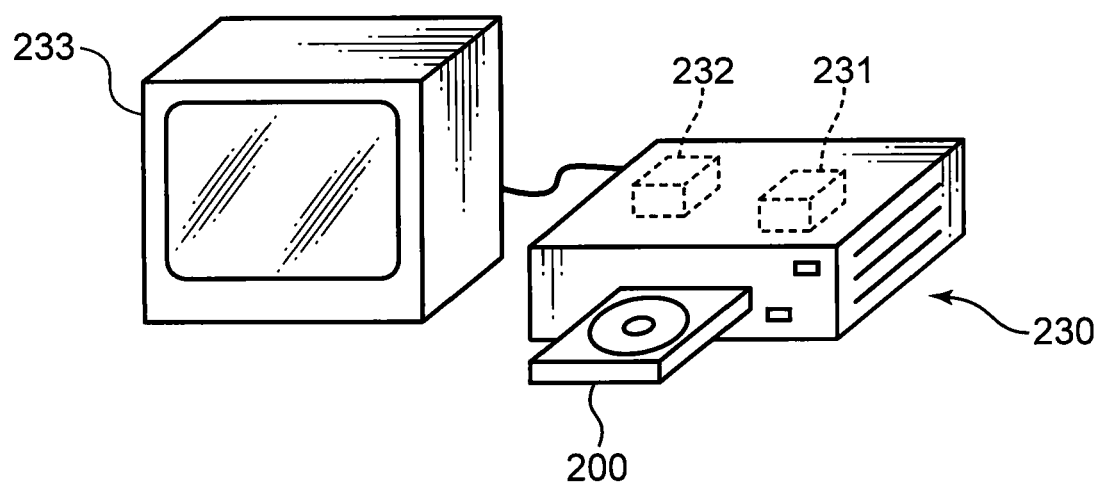
FIG. 13 is a schematic perspective view depicting a general configuration of an optical disk recorder according to Embodiment 6 of the present invention.

FIG. 13 shows an embodiment of an optical disk recorder having the optical information apparatus 200 of Embodiment 3. FIG. 13 is a schematic perspective view depicting a general configuration of the optical disk recorder according to Embodiment 6 of the present invention.

The optical disk recorder according to Embodiment 6 will now be described with reference to FIG. 13. In FIG. 13, the optical disk recorder 230 has the optical information apparatus 200 of Embodiment 3, and an encoder 231 which converts image information into an information signal for the optical information apparatus 200 to record on an optical disk. It is preferable that the optical disk recorder 230 also has a decoder 232 which converts an information signal obtained from the optical information apparatus 200 into an image signal, so that the already recorded information can be reproduced.

The optical disk recorder 230 may have an output device 233. The output device 233 is constituted by a display device (e.g. cathode ray tube, liquid crystal display device) or a printer, for example, and outputs an image signal converted by the decoder 232. The display device displays the image signal converted by the decoder 232, and the printer prints out the image signal converted by the decoder 232.

In Embodiment 6, the optical disk recorder 230 corresponds to an example of the information processing apparatus, and the encoder 231 corresponds to an example of the information processing unit.

The optical disk recorder that has the optical information apparatus 200 of Embodiment 3, or the optical disk recorder that uses the above mentioned recording method or the reproduction method can recognize an optical disk or can seek an optical disk quickly.

(Embodiment 7)

Figure 14:
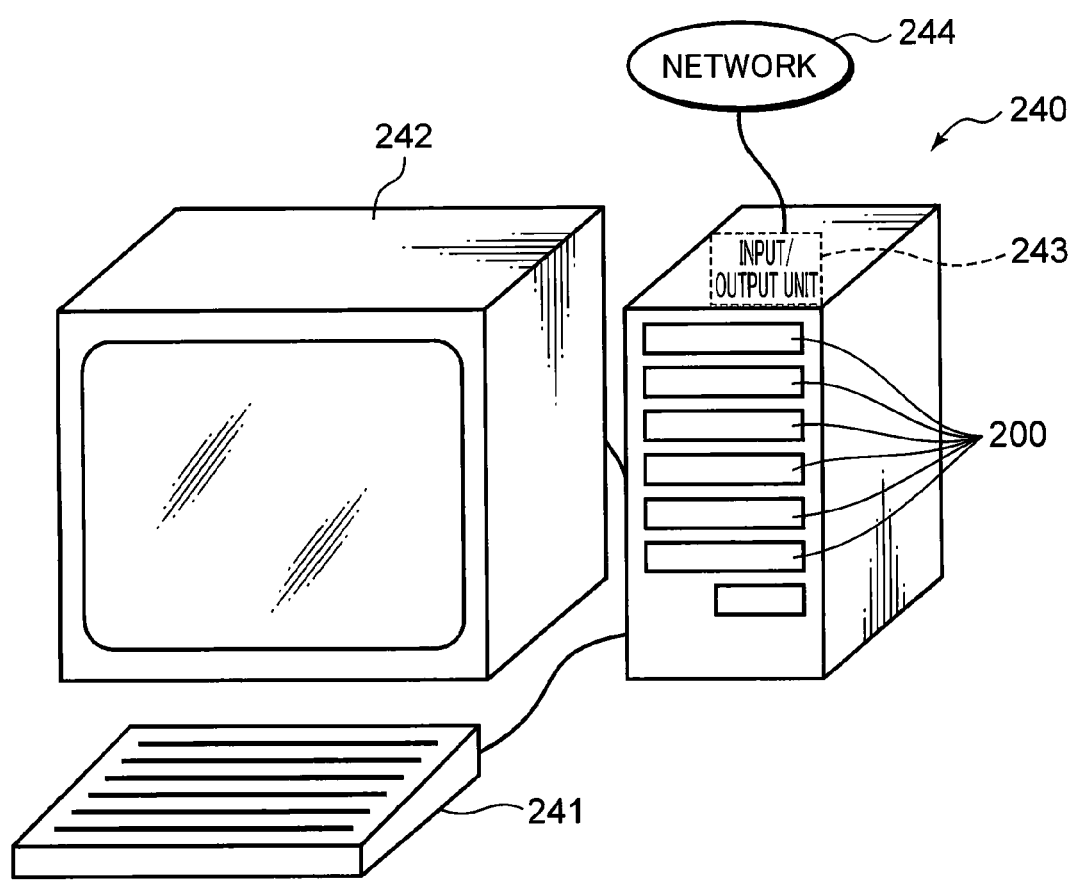
FIG. 14 is a schematic perspective view depicting a general configuration of an optical disk server according to Embodiment 7 of the present invention.

FIG. 14 shows an optical disk server having the optical information apparatus 200 of Embodiment 3. FIG. 14 is a schematic perspective view depicting a general configuration of the optical disk server according to Embodiment 7 of the present invention.

In FIG. 14, the optical disk server 240 has the optical information apparatus 200 of Embodiment 3, an input device 241 and an input/output unit 243. The input device 241 is constituted by a keyboard, a mouse or a touchpad, for example, and inputs information. The input/output unit 243 inputs/outputs information, which is recorded or reproduced by the optical information apparatus 200, from/to an outside component. The input/output unit 243 is connected to a network 244, such as the Internet.

Utilizing the large capacity feature, the optical information apparatus 200 transmits information (e.g. image, sound, video, HTML document, text document) recorded in an optical disk responding to a request from the network 244. The optical information apparatus 200 also records information transmitted from the network 244 in a requested location.

The input/output unit 243 receives information to be recorded by the optical information apparatus 200, or outputs information read by the optical information apparatus 200 to the outside by cable or radio. Thereby the optical disk server 240 can exchange information with a plurality of apparatuses, such as a computer, telephone or TV tuner, via the network 244, and can be used as a shared information server for the plurality of apparatuses. The optical disk server 240 may have an output device 242. The output device 242 is constituted by a display device (e.g. cathode ray tube, liquid crystal display device) or a printer, for example, and outputs information. The display device displays information, and the printer prints out information.

If the optical disk server 240 has a plurality of optical information apparatuses 200 and a charger for inserting/ejecting a plurality of optical disks to/from the plurality of optical information apparatuses 200, a large volume of information can be recorded.

In Embodiment 7, the optical disk server 240 corresponds to an example of the information processing apparatus, and the input/output unit 243 corresponds to an example of the information processing unit.

The optical disk server that has the optical information apparatus 200 of Embodiment 3, or the optical disk server that uses the above mentioned recording method or reproduction method, can recognize an optical disk or can seek an optical disk quickly.

(Embodiment 8)

Figure 15:
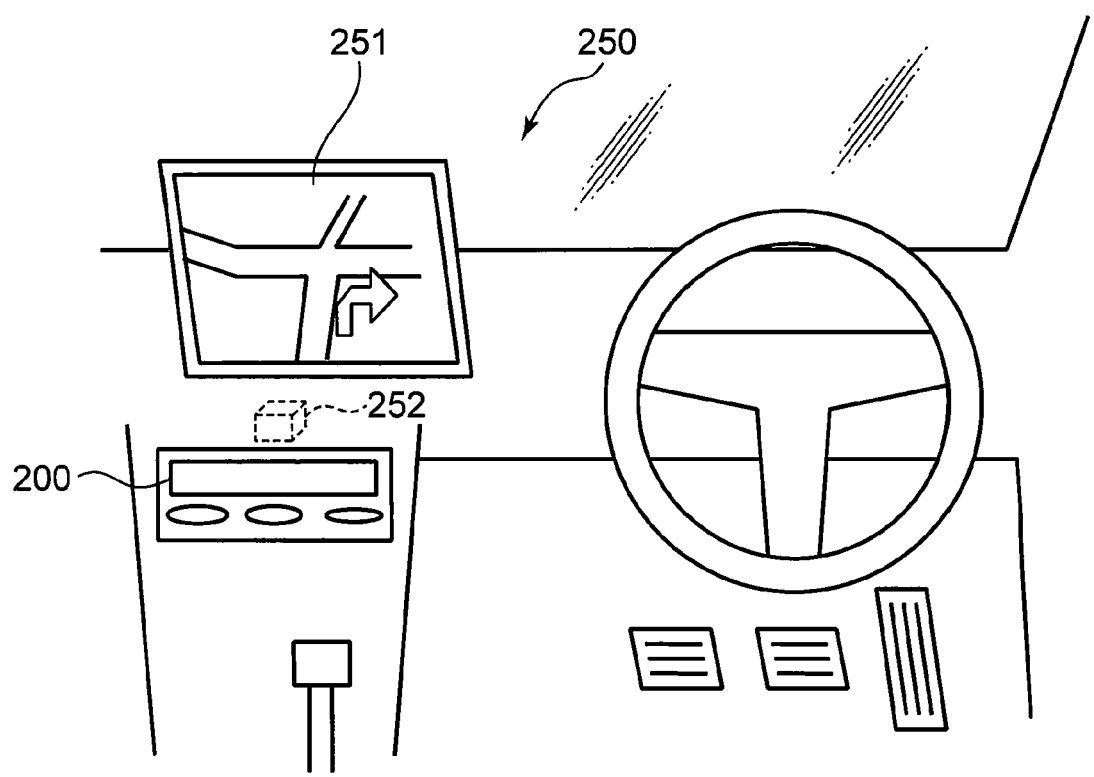
FIG. 15 is a schematic perspective view depicting a general configuration of a car navigation system according to Embodiment 8 of the present invention.

FIG. 15 shows a car navigation system having the optical information apparatus 200 of Embodiment 3. FIG. 15 is a schematic perspective view depicting a general configuration of the car navigation system according to Embodiment 8 of the present invention.

In FIG. 15, the car navigation system 250 has the optical information apparatus 200 of Embodiment 3, a liquid crystal monitor 251 for displaying topographic or destination information, and a decoder 252 which converts an information signal obtained from the optical information apparatus 200 into an image signal.

The car navigation system 250 calculates a current position based on map information recorded in an optical disk, and information from a global positioning system (GPS), a gyroscope, a velocimeter, a distance reorder and the like, and displays the calculated current position on the liquid crystal monitor 251. If a destination is input via an input device (not illustrated), the car navigation system 250 calculates an optimum route up to the inputted destination based on the map information or the road information, and displays the calculated route on the liquid crystal monitor 251.

In Embodiment 8, the car navigation system 250 corresponds to an example of the information processing apparatus, and the decoder 252 corresponds to an example of the information processing unit.

The car navigation system that has the optical information apparatus 200 of Embodiment 3, or the car navigation system that uses the above mentioned recording method or reproduction method can recognize an optical disk or can seek an optical disk quickly.

In the above mentioned Embodiments 4 to 8, the output devices 213, 233 and 242, the display device 222 and the liquid crystal monitor 251 were illustrated in FIG. 11 to FIG.

15, but the computer 210, the optical disk player 220, the optical disk recorder 230, the optical disk server 240 and the car navigation system 250 may be in product formats which have only output terminals, while the output devices 213, 233 and 242, the display device 222 and the liquid crystal monitor 251 are sold separately. In FIG. 12, FIG. 13 and FIG. 15, input devices are not illustrated, but the optical disk player 220, the optical disk recorder 230 and the car navigation system 250 can be in product formats which include an input device constituted by a keyboard, a touchpad, a mouse or a remote controller, for example. In Embodiments 4 to 8, each device can also have a product format which has only input terminals, while the input devices are sold separately.

The above mentioned embodiments primarily include an invention having the following configurations.

An objective lens according to an aspect of the present invention is an objective lens having a diffraction element for dividing light quantity of an incoming beam into two diffracted rays of which orders of diffraction are mutually different, wherein the objective lens collects a diffracted ray having a longer focal length, out of the two diffracted rays, on an information recording surface via a base of an optical disk, in order to record or reproduce information on/from the optical disk, and a distance between focal positions of the two diffracted rays, when the diffracted ray having a longer focal length is collected on the information recording surface, is longer than double the distance between the surface of the objective lens and the surface of the base along the optical axis.

According to this configuration, the objective lens collects a diffracted ray having a longer focal length, out of the two diffracted rays, on the information recording surface via the base material of the optical disk, in order to record or reproduce information on/from the optical disk. The distance between the focal positions of the two diffracted rays, when the diffracted ray having a longer focal length is collected on the information recording surface, is longer than double the distance between the surface of the objective lens and the surface of the base material along the optical axis.

Therefore the distance between the focal positions of the two diffracted rays, when the diffracted ray having a longer focal length is collected on the information recording surface, is longer than double the distance between the surface of the objective lens and the surface of the base material along the optical axis, hence a focus pull-in in error to a position where the distance between the objective lens and the information recording surface of the optical disk is shorter than the original distance, can be prevented, and focal position detection accuracy can be improved.

An optical head apparatus according to another aspect of the present invention comprises: a laser light source that emits a light beam; the above mentioned objective lens, that collects the light beam emitted from the laser light source on the information recording surface of the optical disk via the base of the optical disk; and a photodetector that receives the light beam reflected on the information recording surface, and outputs an electric signal according to the received light quantity. According to this configuration, the above mentioned objective lens can be applied to the optical head apparatus.

An optical head apparatus according to another aspect of the present invention comprises: a laser light source that emits a light beam; an objective lens having a diffraction element for dividing light quantity of an incoming beam into two diffracted rays of which orders of diffraction are mutually different, and collects the light beam emitted from the laser light source on an information recording surface of an optical disk via a base of the optical disk; a lens holder having a protector protruding from the surface of the objective lens toward the optical disk, this lens holder being provided to hold the objective lens; and a photodetector that receives the light beam reflected on the information recording surface, and outputs an electric signal according to a received light quantity, wherein the objective lens collects a diffracted ray having a longer focal length, out of the two diffracted rays, on the information recording surface via the base, in order to record or reproduce information on/from the optical disk, and a distance between focal positions of the two different rays when the diffracted ray having a longer focal length is collected on the information recording surface is longer than double the distance obtained by subtracting a distance of protrusion of the protector protruding from the surface of the objective lens from the distance between the surface of the objective lens and the surface of the base along the optical axis.

According to this configuration, the laser light source emits a light beam. The objective lens has a diffraction element for dividing the light quantity of an incoming beam into two diffracted rays of which orders of diffraction are mutually different, and collects the light beam emitted from the laser light source on an information recording surface of an optical disk via a base material of the optical disk. The lens holder has a protector protruding from the surface of the objective lens toward the optical disk, so as to hold the objective lens. The photodetector receives the light beam reflected on the information recording surface, and outputs an electric signal according to the received light quantity. The objective lens collects a diffracted ray having a longer focal length, out of the two diffracted rays, on the information recording surface via the base material, in order to record or reproduce information on/from the optical disk. A distance between the focal positions of the two diffracted rays when the diffracted ray having a longer focal length is collected on the information recording surface is longer than double the distance obtained by subtracting a distance of the protector protruding from the surface of the objective lens from the distance between the surface of the objective lens and the surface of the base material along the optical axis.

Therefore the distance between the focal positions of the two diffracted rays, when the diffracted ray having a longer focal length is collected on the information recording surface, is longer than double the distance obtained by subtracting a distance of the protector protruding from the surface of the objective lens from the distance between the surface of the objective lens and the surface of the base material along the optical axis, hence a focus pull-in in error to a position where the distance between the objective lens and the information recording surface of the optical disk is shorter than the original distance, can be prevented, even if the lens holder has the protector, and focal position detection accuracy can be improved.

An optical information apparatus according to another aspect of the present invention comprises: the above mentioned optical head apparatus; a motor for rotating an optical disk; and a control unit that controls the motor and the optical head apparatus based on a signal obtained from the optical head apparatus. According to this configuration, the optical head apparatus can be applied to an optical information apparatus.

An information processing apparatus according to another aspect of the present invention comprises: the above mentioned optical information apparatus; and an information processing unit that processes information to be recorded on the optical information apparatus and/or information reproduced from the optical information apparatus. According to this configuration, the optical information apparatus having this optical head apparatus can be applied to an information processing apparatus.

Embodiments and examples described in the "Description of Embodiments" are merely to clarify the technical content of the present invention, and the present invention shall not be interpreted to be limited by these embodiments, but can be modified in numerous ways without departing from the spirit of the invention and the scope of the Claims.

INDUSTRIAL APPLICABILITY

The objective lens and the optical head apparatus according to the present invention allow recording or reproducing information on/from a plurality of types of optical disks of which thickness of the base material, supporting wavelength, recording density and the like are mutually different, and a compatible type optical information apparatus using this optical head apparatus can handle optical disks conforming to many standards, including CD, DVD and BD. As a consequence, the optical information apparatus can be applied to various systems for storing information, such as a computer, optical disk player, optical disk recorder, optical disk server, car navigation system, editing system and AV component.

The invention claimed is:

1. An objective lens having a diffraction element for dividing light quantity of an incoming beam into two diffracted rays of which orders of diffraction are mutually different, wherein the objective lens collects a diffracted ray having a longer focal length, out of the two diffracted rays, on an information recording surface via a base of an optical disk, in order to record or reproduce information on/from the optical disk, and a distance between focal positions of the two diffracted rays when the diffracted ray having a longer focal length is collected on the information recording surface is longer than double the distance between the surface of the objective lens and the surface of the base along the optical axis.

2. An optical head apparatus, comprising:
a laser light source that emits a light beam;
the objective lens according to claim 1 that collects the light beam emitted from the laser light source on the information recording surface of the optical disk via the base of the optical disk; and
a photodetector that receives the light beam reflected on the information recording surface, and outputs an electric signal according to a received light quantity.

3. An optical information apparatus, comprising:
the optical head apparatus according to claim 2;
a motor for rotating an optical disk; and
a control unit that controls the motor and the optical head apparatus based on a signal obtained from the optical head apparatus.

4. An information processing apparatus, comprising:
the optical information apparatus according to claim 3; and
an information processing unit that processes information to be recorded on the optical information apparatus and/or information reproduced from the optical information apparatus.

* * * * *